US005861623A

United States Patent [19]

Park

[11] Patent Number: 5,861,623

[45] Date of Patent: Jan. 19, 1999

[54] N$^{TH}$ ORDER DELAYED EXTRACTION

[75] Inventor: Melvin Park, Nashua, N.H.

[73] Assignee: Bruker Analytical Systems, Inc., Billerica, Mass.

[21] Appl. No.: 644,854

[22] Filed: May 10, 1996

[51] Int. Cl.$^{6}$ .............................. B01D 59/44; H01J 49/00

[52] U.S. Cl. ............................................. 250/287; 250/282

[58] Field of Search ..................................... 250/281, 282, 250/288, 287, 423 P

[56] References Cited

U.S. PATENT DOCUMENTS

| | | | |
|---|---|---|---|
| 5,117,107 | 5/1992 | Guilhaus et al. | 250/287 |
| 5,160,840 | 11/1992 | Vestal | 250/282 |
| 5,382,793 | 1/1995 | Weinberger et al. | 250/288 |
| 5,510,613 | 4/1996 | Reilly et al. | 250/281 |

*Primary Examiner*—Bruce Anderson
*Attorney, Agent, or Firm*—Ward & Olivo

[57] ABSTRACT

An N$^{th}$ order delayed extraction apparatus and method for use in a time-of-flight mass spectrometer is disclosed. A non-linear electric field, produced by specially formed electrodes, is used to accelerate ions, improve flight time focusing and thereby increase mass resolution.

20 Claims, 15 Drawing Sheets

N$^{TH}$ ORDER DELAYED EXTRACTION

The present invention relates generally to ion beam handling in mass spectrometer. More particularly, the invention relates to an apparatus and method for the delayed extraction of sample ions in time-of-flight mass spectrometry. By decreasing flight time distribution, the disclosed apparatus and method yield dramatically improved mass resolution results.

FIELD OF THE INVENTION

Mass spectrometry is an analytical technique in which molecules of a sample are ionized and separated according to their mass/charge ratio (m/z, wherein m is the mass in amu and z is the charge in units of electron charge). The number of ions having the same mass/charge ratio within the resolution capacity of the equipment are counted and are typically reported as a peak on a mass spectrum having a horizontal position which corresponds to the m/z of the ions and a height which corresponds to the quantity of ions.

When a molecule of sample is ionized, it tends to break apart and produce a collection of ions which is characteristic of the parent molecular structure. Mass spectrometers with sufficient resolution are capable of resolving and counting each ion. The resulting spectrum is effectively a fingerprint of the sample. High resolution mass spectrometers are further capable of determining the composition of a sample by resolving the mass to charge ratio of the parent ion so precisely that it can be distinguished from all other possible parent species.

The most common type of mass spectrometer resolves ions of different m/z by accelerating them to the same kinetic energy and then passing them through a magnetic field. In these magnetic instruments, resolution varies directly with the size of the magnet. Even moderate resolution devices are large, delicate and expensive. Accordingly, moderate and high resolution magnetic instruments have been largely confined to laboratory applications.

Another method of resolving ions by mass per charge is known as time-of-flight mass spectrometry (TOFMS). In a TOF mass spectrometer, the ions are accelerated to the same kinetic energy, allowed to traverse a flight path through a defined region and picked up by a detector at the other end of the flight region. TOFMS takes advantage of the fact that ions of different masses and equal initial energy that have been accelerated to the same kinetic energy travel at different velocities, as expressed in the equation:

where e is the elemental charge, V is the potential across the source/accelerating region, m is the ion mass, and v is the ion velocity. TOF mass spectrometers resolve ions by the time it takes them to traverse the flight region. Accordingly, TOF mass spectrometers do not require a magnet or the precise magnetic field variation control circuitry of magnetic instruments.

For accurate time of flight measurement, the instrument must be provided with a means to initialize a time measurement within nanoseconds of the moment of sample ionization. Second, the sample must be highly planar and normal to the flight path. And third, the detector must have good time resolution capability, i.e. a sufficiently fast rise time to detect ion impacts. Electronics and detector must recover sufficiently fast to record subsequent impacts. The effects of nonideal timing and sample alignment can be mitigated by lengthening the flight path.

For the flight time measurement of an instrument to be precise as well as accurate, i.e. such that ions having the same m/z arrive at the detector simultaneously, the kinetic energy imparted by acceleration must be much greater than the statistically random thermal energy of the ions prior to acceleration and the flight region must be shielded from the effects of stray magnetic and nonuniform electric fields which distort the flight path of the ions.

BACKGROUND OF THE INVENTION

Mass spectrometry (MS) has long been used to provide both quantitative and qualitative data not easily available from other analytical techniques. The broad scope of MS technology has been used to provide molecular weight, empirical formula, isotope ratios, identification of functional groups, and elucidation of structure. A great deal of research has been expended in further developing mass spectrometry technology, and improvements in this technology offer realistic expectations of substantially increased use of this analytical procedure.

This invention relates in general to ion beam handling in mass spectrometers and more particularly to a means of accelerating ions in time-of-flight mass spectrometers (TOFMS).

The apparatus and method of mass analysis described herein is an enhancement of the techniques that are referred to in the literature relating to mass spectrometry.

Mass spectrometers are instruments that are typically used to determine the chemical structures of molecules. In operation, molecules become positively or negatively charged in an ionization source and the masses of the resultant ions are determined in vacuum by a mass analyzer that measures their mass/charge (m/z) ratio. Mass analyzers come in a variety of types, including magnetic field (B), combined (double-focusing) electrical (E) and magnetic field (B), quadrupole (Q), ion cyclotron resonance (ICR), quadrupole ion storage trap, and time-of-flight (TOF) mass analyzers, which are of particular importance with respect to the invention disclosed herein. Each mass spectrometric method has a unique set of attributes. Thus, TOFMS is one mass spectrometric method that arose out of the evolution of the larger field of mass spectrometry.

The analysis of ions by TOFMS is, as the name suggests, based on the measurement of the flight times of ions from an initial position to a final position. Ions which have the same initial kinetic energy but different masses will separate when allowed to drift through a field free region.

Ions are conventionally extracted from an ion source in small packets. The ions acquire different velocities according to the mass-to-charge ratio of the ions. Lighter ions will arrive at a detector prior to high mass ions. Determining the time-of-flight of the ions across a propagation path permits the determination of the masses of different ions. The propagation path may be circular or helical, as in cyclotron resonance spectrometry, but typically linear propagation paths are used for TOFMS applications.

TOFMS is used to form a mass spectrum for ions contained in a sample of interest. Conventionally, the sample is divided into packets of ions that are launched along the propagation path using a pulse-and-wait approach. In releasing packets, one concern is that the lighter and faster ions of a trailing packet will pass the heavier and slower ions of a preceding packet. Using the traditional pulse-and-wait approach, the release of an ion packet as timed to ensure that the ions of a preceding packet reach the detector before any overlap can occur. Thus, the periods between packets is relatively long. If ions are being generated continuously, only a small percentage of the ions undergo detection. A significant amount of sample material is thereby wasted. The loss in efficiency and sensitivity can be reduced by storing ions that are generated between the launching of individual packets, but the storage approach carries some disadvantages.

Resolution is an important consideration in the design and operation of a mass spectrometer for ion analysis. The traditional pulse-and-wait approach in releasing packets of ions enables resolution of ions of different masses by separating the ions into discernible groups. However, other factors are also involved in determining the resolution of a mass spectrometry system. "Space resolution" is the ability of the system to resolve ions of different masses despite an initial spatial position distribution within an ion source from which the packets are extracted. Differences in starting position will affect the time required for traversing a propagation path. "Energy resolution" is the ability of the system to resolve ions of different mass despite an initial velocity distribution. Different starting velocities will affect the time required for traversing the propagation path.

In addition, two or more mass analyzers may be combined in a single instrument to form a tandem mass spectrometer (MS/MS, MS/MS/MS, etc.). The most common MS/MS instruments are four sector instruments (EBEB or BEEB), triple quadrupoles (QQQ), and hybrid instruments (EBQQ or BEQQ). The mass/charge ratio measured for a molecular ion is used to determine the molecular weight of a compound. In addition, molecular ions may dissociate at specific chemical bonds to form fragment ions. Mass/charge ratios of these fragment ions are used to elucidate the chemical structure of the molecule. Tandem mass spectrometers have a particular advantage for structural analysis in that the first mass analyzer (MS1) can be used to measure and select molecular ion from a mixture of molecules, while the second mass analyzer (MS2) can be used to record the structural fragments. In tandem instruments, a means is provided to induce fragmentation in the region between the two mass analyzers. The most common method employs a collision chamber filled with an inert gas, and is known as collision induced dissociation ("CID"). Such collisions can be carried out at high (5–10 keV) or low (10–100 eV) kinetic energies, or may involve specific chemical (ion-molecule) reactions. Fragmentation may also be induced using laser beams (photodissociation), electron beams (electron induced dissociation), or through collisions with surfaces (surface induced dissociation). It is possible to perform such an analysis using a variety of types of mass analyzers including TOF mass analysis.

In a TOFMS instrument, molecular and fragment ions formed in the source are accelerated to a kinetic energy:

$$eV = \frac{1}{2}mv^2 \qquad (1)$$

where e is the elemental charge, V is the potential across the source/accelerating region, m is the ion mass, and v is the ion velocity. These ions pass through a field-free drift region of length L with velocities given by equation 1. The time required for a particular ion to traverse the drift region is directly proportional to the square root of the mass/charge ratio:

$$t = L\sqrt{\frac{m}{2eV}} \qquad (2)$$

Conversely, the mass/charge ratios of ions can be determined from their flight times according to the equation:

$$\frac{m}{e} = at^2 + b \qquad (3)$$

where a and b are constants which can be determined experimentally from the flight times of two or more ions of known mass/charge ratios.

Generally, TOF mass spectrometers have limited mass resolution. This arises because there may be uncertainties in the time that the ions were formed (time distribution), in their location in the accelerating field at the time they were formed (spatial distribution), and in their initial kinetic energy distributions prior to acceleration (energy distribution).

The first commercially successful TOFMS was based on an instrument described by Wiley and McLaren in 1955 (Wiley, W. C.; McLaren, I. H., Rev. Sci. Instrumen. 26 1150 (1955)). That instrument utilized electron impact (EI) ionization (which is limited to volatile samples) and a method for spatial and energy focusing known as time-lag focusing. In brief, molecules are first ionized by a pulsed (1–5 microsecond) electron beam. Spatial focusing was accomplished using multiple-stage acceleration of the ions. In the first stage, a low voltage (−150 V) drawout pulse is applied to the source region that compensates for ions formed at different locations, while the second (and other) stages complete the acceleration of the ions to their final kinetic energy (−3 keV ). A short time-delay (1–7 microseconds) between the ionization and drawout pulses compensates for different initial kinetic energies of the ions, and is designed to improve mass resolution. Because this method required a very fast (40 ns) rise time pulse in the source region, it was convenient to place the ion source at ground potential, while the drift region floats at −3 kV. The instrument was commercialized by Bendix Corporation as the model NA-2, and later by CVC Products (Rochester, N.Y.) as the model CVC-2000 mass spectrometer. The instrument has a practical mass range of 400 daltons and a mass resolution of 1/300, and is still commercially available.

There have been a number of variations on this instrument. Muga (TOFTEC, Gainsville) has described a velocity compaction technique for improving the mass resolution (Muga velocity compaction). Chatfield et al. (Chatfield FT-TOF) described a method for frequency modulation of gates placed at either end of the flight tube, and Fourier transformation to the time domain to obtain mass spectra. This method was designed to improve the duty cycle.

Cotter et al. (VanBreeman, R. B.: Snow, M.: Cotter, R. J., Int. J. Mass Spectrom. Ion Phys. 49 (1983) 35.; Tabet, J. C.; Cotter, R. J., Anal. Chem. 56 (1984) 1662; Olthoff, J. K.; Lys, I.: Demirev, P.: Cotter, R. J., Anal. Instrumen. 16 (1987) 93, modified a CVC 2000 time-of-flight mass spectrometer for infrared laser desorption of involatile biomolecules, using a Tachisto (Needham, Mass.) model 215G pulsed carbon dioxide laser. This group also constructed a pulsed liquid secondary time-of-flight mass spectrometer (liquid SIMS-TOF) utilizing a pulsed (1–5 microsecond) beam of 5 keV cesium ions, a liquid sample matrix, a symmetric push/pull arrangement for pulsed ion extraction (Olthoff, J. K.; Cotter, R. J., Anal. Chem. 59 (1987) 999–1002.; Olthoff, J. K.; Cotter, R. J., Nucl. Instrum. Meth. Phys. Res. B-26 (1987) 566–570. In both of these instruments, the time delay range between ion formation and extraction was extended to 5–50 microseconds, and was used to permit metastable fragmentation of large molecules prior to extraction from the source. This in turn reveals more structural information in the mass spectra.

The plasma desorption technique introduced by Macfarlane and Torgerson in 1974 (Macfarlane, R. D.; Skowronski, R. P.; Torgerson, D. F., Biochem. Biophys. Res Commoun. 60 (1974) 616.) formed ions on a planar surface placed at a voltage of 20 kV. Since there are no spatial uncertainties, ions are accelerated promptly to their final kinetic energies toward a parallel, grounded extraction grid, and then travel through a grounded drift region. High voltages are used, since mass resolution is proportional to UO/eV, where the initial kinetic energy, UO is of the order of a few electron volts. Plasma desorption mass spectrometers have been constructed at Rockefeller (Chait, B. T.; Field, F. H., J. Amer. Chem. Soc. 106 (1984) 193), Orsay (LeBeyec, Y.; Della Negra, S.; Deprun, C.; Vigny, P.; Giont, Y. M., Rev. Phys. Appl 15 (1980) 1631), Paris (Viari, A.; Ballini, J. P.; Vigny, P.; Shire, D.; Dousset, P., Biomed. Environ. Mass Spectrom, 14 (1987) 83), Upsalla (Hakansson, P.; Sundqvist B., Radiat. Eff. 61 (1982) 179) and Darmstadt (Becker, O.; Furstenau, N.; Krueger, F. R.; Weiss, G.; Wein, K., Nucl. Instrum. Methods 139 (1976) 195). A plasma desorption time-of-flight mass spectrometer has been commercialized by BIO-ION Nordic (Upsalla, Sweden). Plasma desorption utilizes primary ion particles with kinetic energies in the MeV range to induce desorption/ionization. A similar instrument was constructed at Manitoba (Chain, B. T.; Standing, K. G., Int. J. Mass Spectrum. Ion Phys. 40 (1981) 185) using primary ions in the keV range, but has not been commercialized.

Matrix-assited laser desorption, introduced by Tanaka et al. (Tanaka, K.; Waki, H.; Ido, Y.; Akita, S.; Yoshida, Y.; Yoshica, T., Rapid Commun. Mass Spectrom. 2 (1988) 151) and by Karas and Hillenkamp (Karas, M.; Hillenkamp, F., Anal. Chem. 60 (1988) 2299) utilizes TOFMS to measure the molecular weights of proteins in excess of 100,000 daltons. An instrument constructed at Rockefeller (Beavis, R. C.; Chait, B. T., Rapid Commun. Mass Spectrom. 3 (1989) 233) has been commercialized by VESTEC (Houston, Tex.), and employs prompt two-stage extraction of ions to an energy of 30 keV.

Time-of-flight instruments with a constant extraction field have also been utilized with multi-photon ionization, using short pulse lasers.

The instruments described thus far are linear time-of-flights, that is: there is no additional focusing after the ions are accelerated and allowed to enter the drift region. Additional energy focusing approaches have also been developed, including passing the ion beam through an electrostatic energy filter.

Since at least the mid 1970's, it has also been known to use a mass reflectron in conjunction with mass spectrometry in order to improve performance. A mass reflectron for a time-of-flight mass spectrometer is disclosed in an article entitled "The Mass Reflectron, A New Nonmagnetic Time-of-Flight Mass Spectrometer with High Resolution" by Mamyrin et al. A mass spectrometer with an improved reflectron is discussed in an article by Gohl et al entitled "Time-of-Flight Mass Spectrometry for Ions of Large Energy Spread", with this latter reflectron utilizing a "two-stage mirror" to minimize ion flight time variations. A recent article entitled "A Secondary Ion Time-of-Flight Mass Spectrometer With an Ion Mirror" by Tang et al illustrated that the two-stage mirror concept does not provide substantially improved results over a single-stage mirror. Accordingly, much of the effort to improving mass spectrometry techniques has been directed away from improvements to the reflectron.

U.S. Pat. No. 4,778,993 is directed to time-of-flight (TOF) mass spectrometer which substantially eliminates interference with the analysis by ions of mass greater than the highest mass of interest. U.S. Pat. No. 4,883,958 discloses an interface for coupling liquid chromatography to solid or gas phase detectors. An improved technique for TOF mass analysis involving laser desorption is disclosed in U.S. Pat. No. 5,045,694. Matrix-assisted laser desorption mass spectrometry and a two-stage reflectron were discussed in an article in Rapid Communication in Mass Spectrometry, Vol. 5, pp 198–202 (1991). Additional background information regarding time-of-flight mass spectrometry is in a keynote lecture by LeBeyec published in Advances in Mass Spectrometry, Vol. II A, pp 126–145.

The reflectron (or ion mirror) was first described by Mamyrin (Mamyrin, B. A.; Karatajev. V. J.; Shmikk, D. V.; Zagulin, V. A., Sov. Phys., JETP 37 (1973) 45). At the end of the drift region, ions enter a retarding field from which they are reflected back through the drift region at a slight angle. Improved mass resolution results from the fact that ions with larger kinetic energies must penetrate the reflecting field more deeply before being turned around. These faster ions then catch up with the slower ions at the detector and are focused. Reflectrons were used on the laser microprobe instrument introduced by Hillenkamp et al. (Hillenkamp, F.; Kaufmann, R.; Nitsche, R.; Unsold, E., Appl. Phys. 8 (1975) 341) and commercialized by Leybold Hereaus as the LAMMA (LAser Microprobe Mass Analyzer). A similar instrument was also commercialized by Cambridge Instruments as the IA ( Laser Ionization Mass Analyzer). Benninghoven (Benninghoven reflectron) has described a SIMS (secondary ion mass spectrometer) instrument that also utilizes a reflectron, and is currently being commercialized by Leybold Hereaus. A reflecting SIMS instrument has also been constructed by Standing (Standing, K. G.; Beavis, R.; Bollbach, G.; Ens, W.; Lafortune, F.; Main, D.; Schueler, B.; Tang, X.; Westmore, J. B., Anal. Instrumen. 16 (1987) 173).

Lebeyec (Della-Negra, S.; Lebeyec, Y., in Ion Formation from Organic Solids IFOS III, ed. by A. Benninghoven, pp 42–45, Springer-Verlag, Berlin (1986)) described a coaxial reflectron time-of-flight that reflects ions along the same path in the drift tube as the incoming ions, and records their arrival times on a channelplate detector with a centered hole that allows passage of the initial (unreflected) beam. This geometry was also utilized by Tanaka et al. (Tanaka, K.; Waki, H.; Ido, Y.; Akita, S.; Yoshida, T., Rapid Comun. Mass Spectrom. 2 (1988) 151) for matrix assisted laser desorption. Schlag et al. (Grotemeyer, J.; Schlag, E. W., Org. Mass Spectrom. 22 (1987) 758) have used a reflectron on a two-laser instrument. The first laser is used to ablate solid samples, while the second laser forms ions by multiphoton ionization. This instrument is currently available from Bruker. Wollnik et al. (Grix., R.; Kutscher, R.; Li, G.; Gruner, U.; Wollnik, H., Rapid Commun. Mass Spectrom. 2 (1988) 83) have described the use of reflectrons in combination with pulsed ion extraction, and achieved mass resolutions as high as 20,000 for small ions produced by electron impact ionization.

An alternative to reflectrons is the passage of ions through an electrostatic energy filter, similar to that used in double-focusing sector instruments. This approach was first described by Poschenroeder (Poschenroeder, W., Int. J. Mass Spectrom. Ion Phys. 6 (1971) 413). Sakurai et al. (Sakuri, T.; Fujita, Y; Matsuo, T.; Matsuda, H; Katakuse, I., Int. J. Mass Spectrom. Ion Processes 66 (1985) 283) have developed a time-of-flight instrument employing four electrostatic energy analyzers (ESA) in the time-of-flight path. At Michigan State, an instrument known as the ETOF was described that utilizes a standard ESA in the TOF analyzer (Michigan ETOF).

Lebeyec et al. (Della-Negra, S.; Lebeyec, Y., in Ion Formation from Organic Solids IFOS III, ed. by A. Benninghoven, pp 42–45, Springer-Verlag, Berlin (1986)) have described a technique known as correlated reflex spectra, which can provide information on the fragment ion arising from a selected molecular ion. In this technique, the neutral species arising from fragmentation in the flight tube are recorded by a detector behind the reflectron at the same flight time as their parent masses. Reflected ions are registered only when a neutral species is recorded within a preselected time window. Thus, the resultant spectra provide fragment ion (structural) information for a particular molecular ion. This technique has also been utilized by Standing (Standing, K. G.; Beavis, R.; Bollbach, G.; Ens, W.; Lafortune, F.; Main, D.; Schueler, B.; Tang, X.; Westmore, J. B., Anal. Instrumen. 16 (1987) 173).

TOF mass spectrometers do not scan the mass range, but rather record ions of all masses following each ionization event. Nevertheless, this mode of operation has some analogy with the linked scans obtained on double-focusing sector instruments. In both instruments, MS/MS information is obtained at the expense of high resolution. In addition, correlated reflex spectra can be obtained only on instruments which record single ions on each TOF cycle, and are therefore not compatible with methods (such as laser desorption) which produce high ion currents following each laser pulse.

New ionization techniques, such as plasma desorption (Macfarlane, R. D.; Skowronski, R. P.; Torgerson, D. F.; Biochem. Bios. Res. Commun. 60 (1974) 616), laser desorption (VanBreemen, R. B.; Snow, M.; Cotter, R. J., Int. J. Mass Spectrom. Ion Phys. 49 (1983) 35; Van der Peyl, G. J. Q.; Isa, K.; Haverkamp, J.; Kistemaker, P. G., Org. Mass Spectrom. 16 (1981) 416), fast atom bombardment (Barber, M.; Bordoli, R. S.; Sedwick, R. D.; Tyler, A. N., J. Chem. Soc., Chem. Commun. (1981) 325–326) and electrospray (Meng, C. K.; Mann, M.; Fenn, J. B., Z. Phys. D10 (1988) 361), have made it possible to examine the chemical structures of proteins and peptides, glycopeptides, glycolipids and other biological compounds without chemical derivatization. The molecular weights of intact proteins can be determined using matrix assisted laser desorption ionization (MALDI) on a TOF mass spectrometer or electrospray ionization. For more detailed structural analysis, proteins are generally cleaved chemically using CNBr or enzymatically using trypsin or other proteases. The resultant fragments, depending upon size, can be mapped using MALDI, plasma desorption or fast atom bombardment. In this case, the mixture of peptide fragments (digest) is examined directly resulting in a mass spectrum with a collection of molecular ion corresponding to the masses of each of the peptides. Finally, the amino acid sequences of the individual peptides which make up the whole protein can be determined by fractionation of the digest, followed by mass spectral analysis of each peptide to observe fragment ions that correspond to its sequence.

It is in this sequencing of peptides that tandem mass spectrometry may provide major advantages over other available techniques and instrumentation. Generally, most of the new ionization techniques are successful in producing intact molecular ions, but not in producing fragmentation. In a tandem instrument the first mass analyzer passes molecular ions corresponding to the peptide of interest. These ions are activated toward fragmentation in a collision chamber, and their fragmentation products are extracted and focused into the second mass analyzer which records a fragment ion (or daughter ion) spectrum.

A tandem TOFMS consists of two TOF analysis regions with an ion gate between the two regions. The ion gate allows one to gate (i.e. select) ions which will be passed from the first TOF analysis region to the second. As in conventional TOFMS, ions of increasing mass have decreasing velocities and increasing flight times. Thus, the arrival time of ions at the ion gate at the end of the first TOF analysis region is dependent on the mass-to-charge ratio of the ions. If one opens the ion gate only at the arrival time of the ion mass of interest, then only ions of that mass-to-charge will be passed into the second TOF analysis region.

However, it should be noted that the products of an ion dissociation that occurs after the acceleration of the ion to its final potential will have the same velocity as the original ion. The product ions will therefore arrive at the ion gate at the same time as the original ion and will be passed by the gate (or not) just as the original ion would have been.

The arrival times of product ions at the end of the second TOF analysis region is dependent on the product ion mass because a reflectron is used. As stated above, product ions have the same velocity as the reactant ions from which they originate. As a result, the kinetic energy of a product ion is directly proportional to the product ion mass. Because the flight time of an ion through a reflectron is dependent on the kinetic energy of the ion, and the kinetic energy of the product ions are dependent on their masses, the flight time of the product ions through the reflectron is dependent on their masses.

Because TOFMS is a pulsed technique, it is most readily applied with pulsed ion sources such as matrix assisted laser desorption/ionization (MALDI). While mass spectra are readily produced via MALDI-TOF mass spectrometry, such spectra typically have a relatively low mass resolution. The main reason the mass resolution of such instruments is not higher is that the ions have some initial velocity distribution when they are produced. This distribution of initial velocities is the result of the method of ion production and is not readily eliminated.

To compensate the flight times of the ions for this velocity distribution, one may use a method known as delayed extraction (DE) [2, 3]. In performing conventional DE experiments, ions are not accelerated until a set time, T, after ion production has occurred. That is, no accelerating electric field is applied until time T. In cases where DE is useful, the kinetic energy of the ions is a well defined function of the distance of the ion from the sample surface at time T. For example, in MALDI-TOF, between the time of ion production and time T, the ions drift away from the sample surface according to their initial velocities. At time T, the kinetic energy of the ions will be directly proportional to the square of the distance the ions have drifted. Because the ions kinetic energy and position are related, the accelerating electric field applied at time T can be used to simultaneously "space" and "energy" compensate the flight times of the ions. In this way, all ions of a given mass-to-charge ratio will arrive at the detector nearly simultaneously. This results in an improvement in the mass resolution.

As described by Whittal and Li (R. M. Whittal and L. Li, "High Resolution Matrix-Assisted Laser Desorption/Ionization in a Linear Time-of-Flight Mass Spectrometer", *Anal. Chem.* 67(13), 1950(1995), a time-lag focusing ("TLF") method of ion extraction may be used in a simple linear system to provide mass resolution on a par with a reflectron TOFMS. With conventional MALDI instruments, the ions generated by the laser beam near the surface of the sample probe are extracted by a dc potential. In TLF, a short time delay (under 300 ns) is inserted between the laser ionization and the ion extraction events. The region between the repeller and extraction grid is field-free during the delay. Following the delay, a pulsed potential is applied to the repeller. Application of the appropriate pulse voltage provides the energy correction necessary to simultaneously detect all ions of the same mass/charge regardless of their inital energy. The initially less energetic ions closer to the repeller receive more energy (from the pulsed potential) than the initally more energetic ions further from the repeller at the time the pulse is applied. An energy/spatial correction is said to be provided such that all ions of the same mass/charge reach the detector plane simultaneously.

However, prior art DE does not apply the correct potential gradient to perfectly space and energy focus the ions. Rather in prior art DE, a simple linear field gradient is applied between the sample surface and an extraction grid. This provides only a first order correction for the initial ion velocity distribution. The higher order DE focusing method of the present invention focuses the ions perfectly in space and energy. Consequently, Nth order DE focusing can produce higher mass resolution spectra at lower operating voltages than prior art first order DE.

Other references relating generally to the technology herein disclosed include, for example, F. Hillenkamp, M. Karas, R. C. Beavis, B. T. Chait, *Anal. Chem.* 63(24), 1193A(1991); Wei Hang, Pengyuan Yag, Xiaoru Wang, Chenglong Yang, Yongxuan Su, and Benli Huang, *Rapid Comm. Mass Spectrom.* 8, 590(1994); A. N. Verentchikov, W. Ens, K. G. Standing, *Anal.Chem.* 66, 126(1994); J. H. J. Dawson, M. Guilhaus, *Rapid Comm. Mass Spectrom.* 3, 155(1989); M. Guilhaus, *J. Am. Soc. Mass Spectrom.* 5, 588(1994); E. Axelsson, L. Holmlid, *Int. J. Mass Spectrom. Ion Process.* 59, 231(1984); O. A. Mirgorodskaya, et al., *Anal. Chem.* 66, 99(1994); S. M. Michael, B. M. Chien, D. M. Lubman, *Anal. Chem.* 65, 2614(1993); W. C. Wiley, I. H. McLaren, *Rev. Sci. Inst.* 26(12), 1150(1955); R. C. Beavis and B. T. Chait, *Chem. Phys. Lett.* 181(5), 479(1991); R. S. Brown and J. J. Lennon, *Anal. Chem.* 67(13), 1998(1995); R. M. Whittal and L. Li, *Anal. Chem.* 67(13), 1950(1995).

SUMMARY OF THE INVENTION

In TOF mass spectrometry, the mass-to-charge ratio of sample ions are measured via their flight times from some starting location to a set final location (a detector). As outlined above, many factors can influence the ion flight times. Included among these are the initial kinetic energies (velocities) and the initial positions of the ions. Because analyte ions have a distribution of initial kinetic energies and positions, ions of a given mass-to-charge ratio will have a distribution of flight times. The range of flight times of ions of a given mass-to-charge ratio will determine the ability of a spectrometer to resolve differing mass-to-charge ions from one another.

It is a continuing problem with the application of existing TOF mass spectrometry that ions are frequently produced over a rather broad energy distribution range, thereby adversely affecting mass resolution. When matrix-assisted laser desorption is employed to produce ions, the ions are typically carried along in a plume of rapidly expanding matrix vapor which produces some ions at an energy level in excess of that acquired from the accelerating field. Moreover, ions accelerated by the electrical field may undergo collisions with gas phase molecules, thereby transferring a portion of their energy or their charge to the molecules. Also, some ions may spontaneously dissociate, thereby losing some of their mass and energy. Accordingly, some ions may have less energy than those which traverse the accelerating field without undergoing collisions, and accordingly spend a longer time in the accelerating field and drift regions of the time-of-flight mass spectrometer. Other ions may have larger kinetic energies, and accordingly spend a shorter time in traversing the accelerating field and drift regions to reach the detector. In other applications of TOF mass spectrometry, ions may be formed with very little initial kinetic energy, but unlike laser desorption in which the ions are formed at or very near a surface with a well-defined electrical potential, the ions may be formed throughout a region. An electrical field is applied to accelerate the ions and, as a consequence of their differing initial positions in this field, the ions acquire differing amounts of kinetic energy.

The present invention recognizes the significant effect that the ion energy distribution has on the performance of a TOFMS, and further recognizes that such energy distributions may have several causes. For example, in matrix-assisted laser desorption, some of the ions may be produced with excess initial kinetic energy as the result of acceleration by the plume of expanding matrix vapor, while other ions may lose energy as the result of collisions with molecules in the plume and be delayed in exiting the plume as the result of such collisions. Still other ions may dissociate in flight, thereby losing that portion of their energy (and mass) carried by the neutral fragment. The present invention provides a new time-of-flight mass analyzer which allows all of these effects, which otherwise limit the mass resolution, to be simultaneously corrected while maintaining efficient ion transmission from the source to the detector.

An improved time-of-flight mass spectrometer according to the present invention preferably includes a conventional sealed housing and vacuum pump for maintaining a vacuum within the housing. An ion source is provided for producing pulses of ions through a primary accelerating field. A reflectron is provided downstream of a first ion drift region and upstream of a second ion drift region, and an ion detector downstream from the second ion drift region detects ions as a function of time. Additional elements involving acceleration and deceleration of ions may optionally be installed within either the first or second drift regions to focus the ions or to remove unwanted low energy ions. The ion reflection device preferably includes a first plurality of spaced reflecting plates for establishing a first ion mirror to reflect ions with energy less than that acquired by acceleration of ions in the primary accelerating field, a second reflecting plate or plates for establishing a second reflecting field, and means for adjusting the second reflecting field independent of the first field so that the total flight time of ions produced with excess kinetic energy is substantially the same as those produced with no excess kinetic energy. The first ion mirror of the present invention may be either a single-stage or a two-stage reflection mirror, each of which by itself is known in the prior art.

The present invention may optionally include additional elements to improve the overall performance of the time-of-flight mass spectrometer without degrading the desired compensation for energy distributions of the ion beam. For example, a deaccelerating/accelerating energy filter may be positioned between the second drift region and the detector. A potential equal to that applied to produce the primary accelerating field may be applied to the central element of this energy filter. In this manner, ions with an energy significantly less than that imparted by the primary accelerating field are prevented from reaching the detector. Accordingly, ions which have undergone dissociation after acceleration, or ions which have undergone collisions in the ion source which reduced their energy and delayed their extraction from the source, do not reach the detector and hence do not contribute to loss of mass resolution by the instrument. In the present invention, this removal of undesirable ions is accomplished while at the same time making the flight time of transmitted ions nearly independent of their excess kinetic energy. Similarly, focusing elements such as beam guides may be provided in the first and second ion drift regions to increase the ion transmission through these regions without materially reducing the overall mass resolution of the time-of-flight mass spectrometer. An adjustment means external to the housing may be provided for selectively adjusting the spacing between the ion reflecting device and the ion source and/or detector.

It is known that in certain cases, DE can be used to decrease the flight time distribution and thereby improve the mass resolution of a mass spectrometer. In particular, DE can be used if ions are produced from a solid sample by a laser pulse, as is the case in MALDI. In this case, one can correlate the kinetic energies of ions with their positions at some time after the laser pulse. By applying an appropriate accelerating electric field at this time, it is possible to correct for the kinetic energies and positions of the ions so as to reduce the flight time distributions of the ions.

In the case of conventional DE, an electric field with a linear potential drop with respect to position is used. Such a field gives a first order correction to the ion flight times with respect to their initial kinetic energies. In the performance of Nth order DE, the accelerating electric field is not applied until some time, T, after ion production. However, Nth order DE uses a non-linear electric field to accelerate the ions. That is, the electric potential applied is a non-linear function of position in the initial accelerating region. This non-linear field is produced through the use of specially formed electrodes as described below. The field provides improved flight time focusing with respect to the initial ion kinetic energies over conventional MALDI-TOF and MALDI-TOF with conventional DE.

It is an object of the present invention to provide an improved time-of-flight mass spectrometer with high performance.

Still another object of the invention is to provide an improved TOFMS having specially formed electrodes which produce a non-linear electric field capable of accelerating ions and thereby improving mass resolution.

It is a further object of the invention to provide an improved DE apparatus and method and thereby improve mass analyzer performance.

It is an advantage of the present invention that comparatively simple yet reliable techniques are provided for significantly increasing the resolution of time-of-flight mass spectrometry technology.

Another advantage of the present invention is that an improved DE apparatus and method for a time-of-flight mass analyzer is provided which corrects ion flight time variations induced in the source region of the mass spectrometer.

Preferably, the invention is a new and improved design and method for a MALDI-TOF mass spectrometer incorporating Einsel lens focusing and a two-stage gridless reflectron of the type disclosed in U.S. Pat. No. 4,731,532. Other objects, features, and characteristics of the present invention, as well as the methods of operation and functions of the related elements of the structure, and the combination of parts and economies of manufacture, will become more apparent upon consideration of the following detailed description, wherein reference is made to figures in the accompanying drawings.

DETAILED DESCRIPTION OF THE PREFERRED EMBODIMENT

Figure 1:
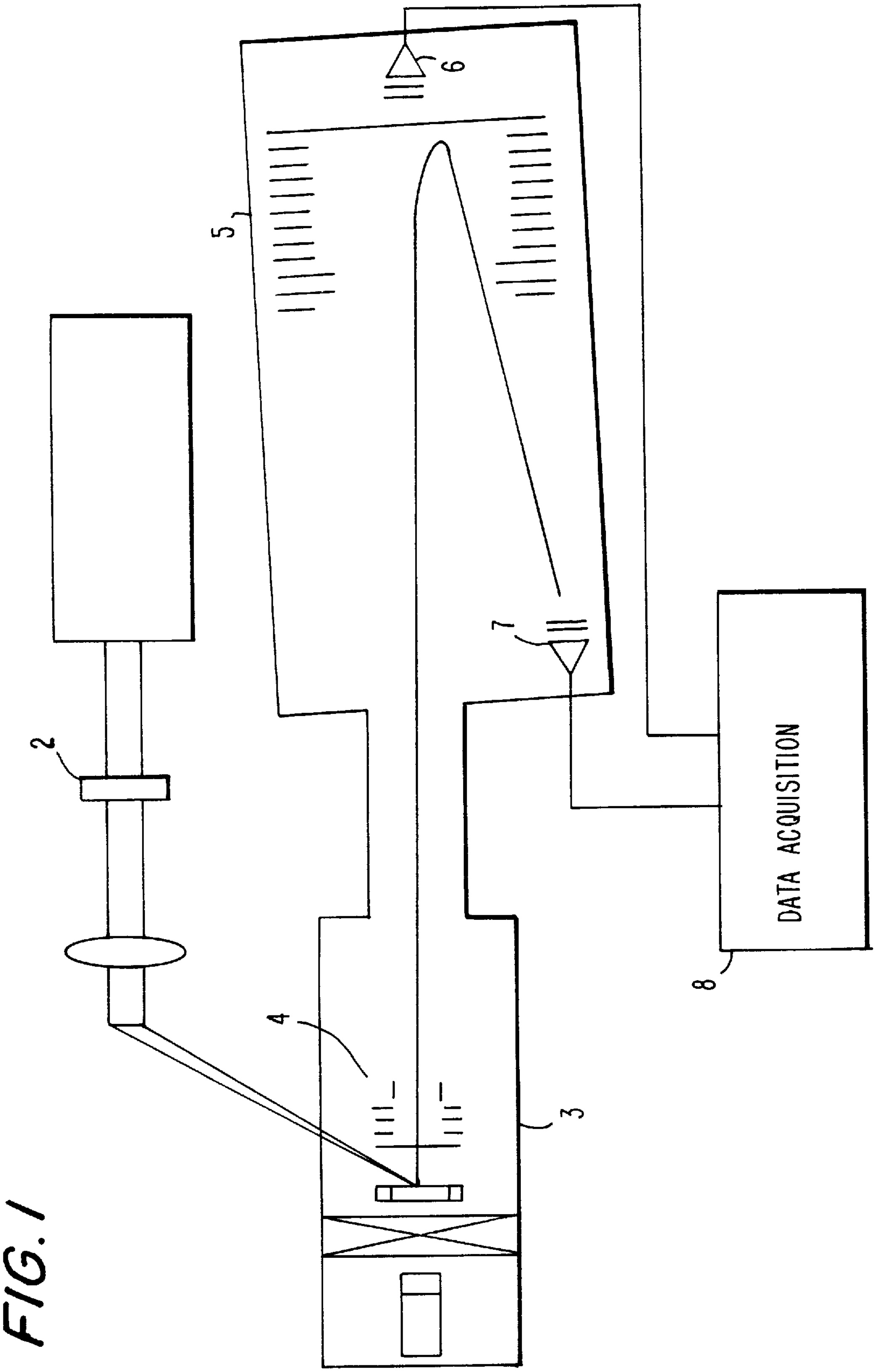
FIG. 1 is a schematic view of a prior art MALDI TOF mass spectrometer.

With respect to FIG. 1, a prior art TOFMS 1 is depicted, with a laser system 2, ion source 3, blanking plates 4, reflectron 5, linear detector 6, reflector detector 7, and data acquisition unit 8. In FIG. 1, the radiation from laser system 2 generates ions from a solid sample. Ions are accelerated through, and out of, ion source 3 by an electrostatic field. The accelerating electric field is formed so as to accelerate the ions toward detector 6. Some unwanted ions can be removed from the ion beam using blanking plates 4. The remaining ions drift through the spectrometer until they arrive at linear detector 6. Alternatively, reflectron 5 may be used to reflect the ions so that they travel to reflector detector 7. The mass and abundance of the ions is measured via data acquisition system 8 as the flight time of the ions from the source 3 to one of the detectors 6 or 7 and the signal intensity at the detectors respectively.

Figure 2:
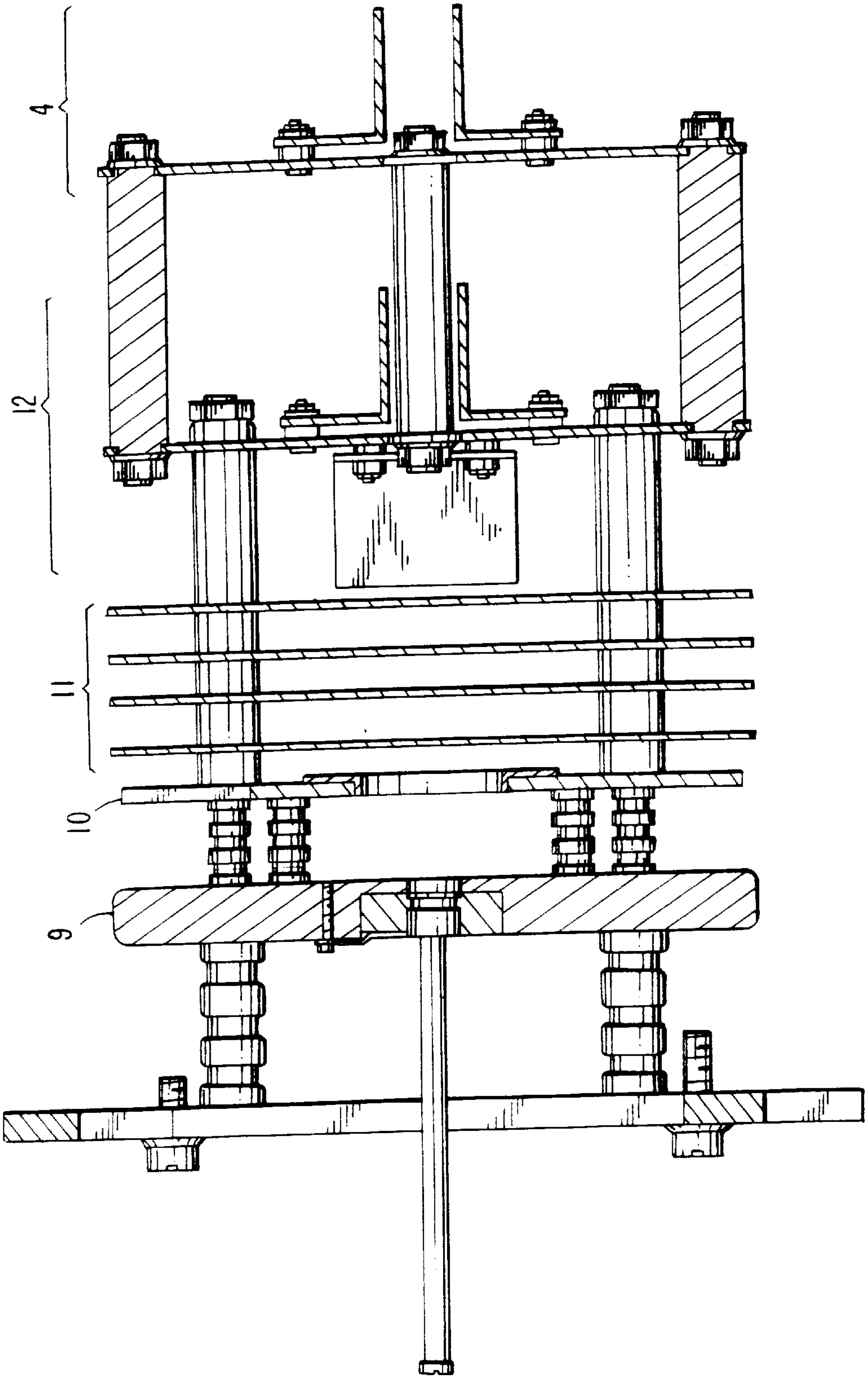
FIG. 2 is a diagram of an ion source as used with the conventional MALDI TOF spectrometer depicted in FIG. 1.

With respect to FIG. 2, a diagram of an ion source 3 as used with conventional MALDI-TOF. Electrodes 4, 9, 10, 11, and 12 are made from electrically conducting materials. Electrodes 9, 10, and 11 are metal disks. Electrodes 10 and 11 have circular apertures at their centers through which ions may pass. Ions are generated at the right surface of sample plate 9 which is biased to a high voltage (e.g. 20 kV). Extraction plate 10 is held at ground potential throughout the measurement. Ions are accelerated toward detector 6 (right) by an electrostatic field generated between electrodes 9 and 10. The ions pass through the aperture in plate 10 and continue on through Einsel lens 11. Ions are spatially focused by electrostatic lens system 11, and steered in two dimensions by the deflection plates 12. Finally, some types of unwanted ions are removed from the ion beam by blanking plates 4.

Figure 3:
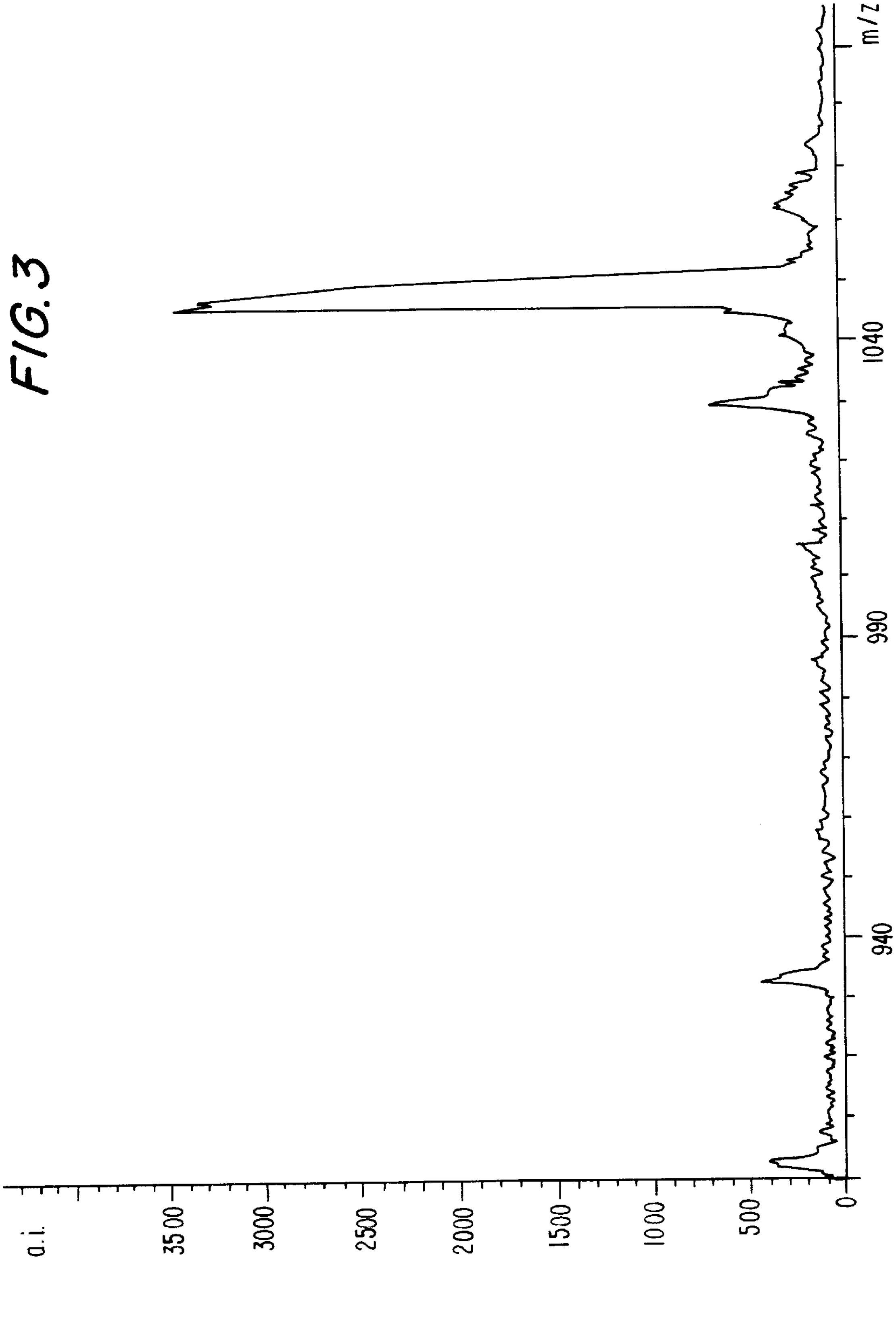
FIG. 3 is a graph of signal intensity vs. mass (a mass spectrum) for angiotensin II showing the molecular ion at mass 1047 amu, obtained using the prior art MALDI TOF system of FIG. 1.

With respect to FIG. 3, a graph of the mass spectrum of angiotensin II as obtained using the prior art MALDI TOF system depicted in FIGS. 1 and 2 is shown. FIG. 3 plots the intensity of the signal produced by detector 7 as a function of ion mass-to-charge ratio. The molecular ion of angiotensin II appears at mass 1047 amu. This spectrum was recorded using reflectron 5. As a result, it is possible to observe some ions (at apparent masses 902, 933, and 1030 amu) which are products of the dissociation of molecular ions.

Figure 4:
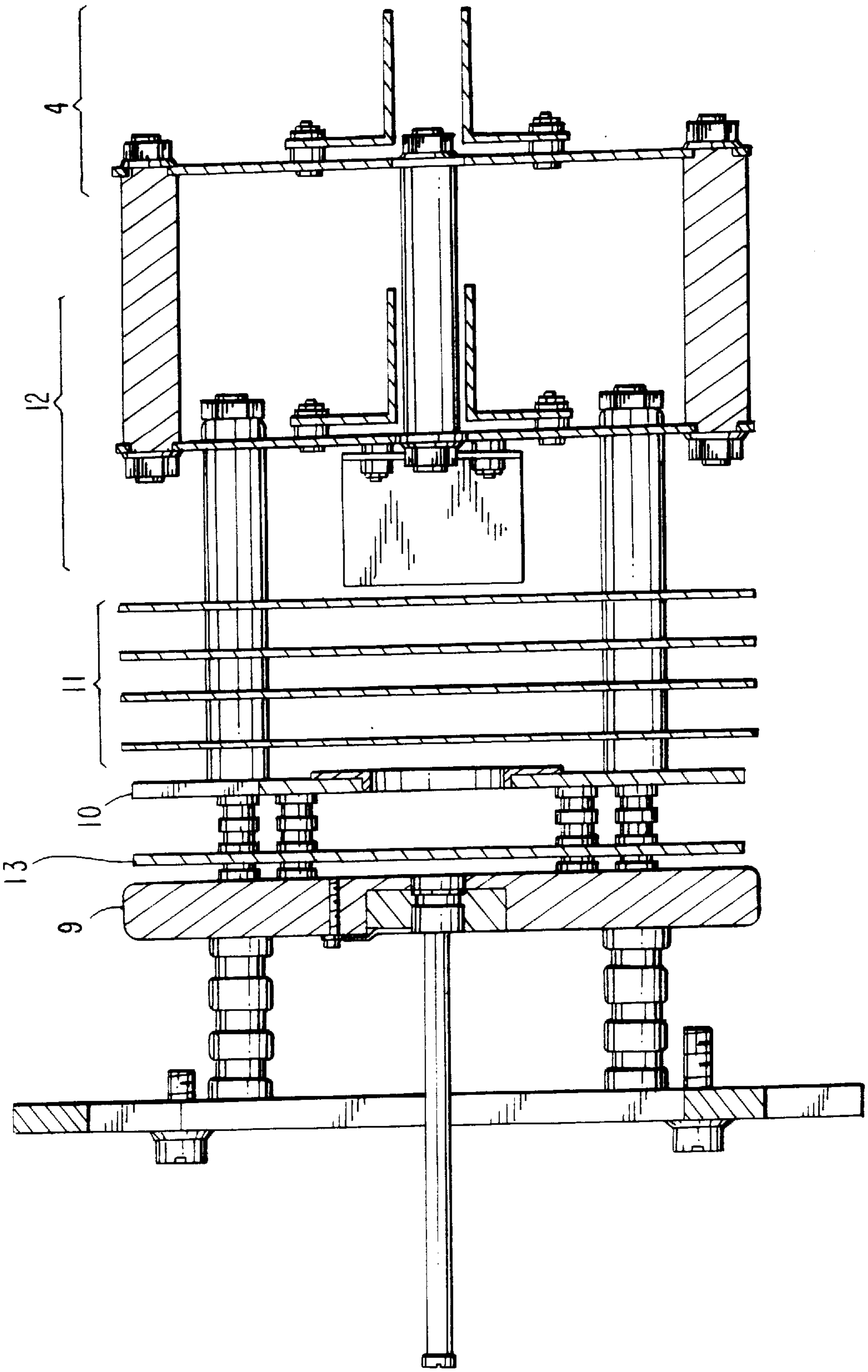
FIG. 4 is a diagram of a MALDI TOF ion source of FIG. 2 modified to include an additional extraction plate which is used for conventional delayed extraction.

With respect to FIG. 4, a diagram of ion source 3 modified to include extraction plate 13 as used with conventional DE experiments. Extraction plate 13 is a metal disk with an aperture at its center through which ions can pass. At the beginning of a TOF analysis, there is no potential difference between extraction plate 13 and sample plate 9. As depicted in the timing diagram of FIG. 5, ions are produced at some time $t_o$ by a laser pulse incident on sample plate 9. At time $t_o$, and for some period afterward, the potential on extraction plate 13 is the same as sample plate 9 (in the case depicted, 7.451 kV). At some later time, T, the potential on extraction plate 13 is rapidly lowered to a second potential (in this example, 6.888 kV) whereas the potential on sample plate 9 is maintained at its original potential (7.451 kV).

In the period between $t_o$ and T, ions generated by the laser pulse drift away from sample plate 9 according to their initial velocities. Because the ions experience no electric field gradient in this time period, the initial velocities of the ions is a simple function of position and time. At time T, the component of the initial kinetic energy, $KE_o$, of the ions, in the time-of-flight direction is given by:

$$KE_o = \frac{1}{2}\, m \left(\frac{x}{T}\right)^2 \tag{4}$$

where m is the mass of the ion, and x is the distance from the starting position of the ion on sample plate 9 in the time-of-flight direction. As an example, the initial kinetic energy of a 2,000 amu ion is plotted in FIG. 6 as a function of the position, x, assuming T is one $\mu$sec. Note that the kinetic energy is a non-linear function of position.

Figure 7:
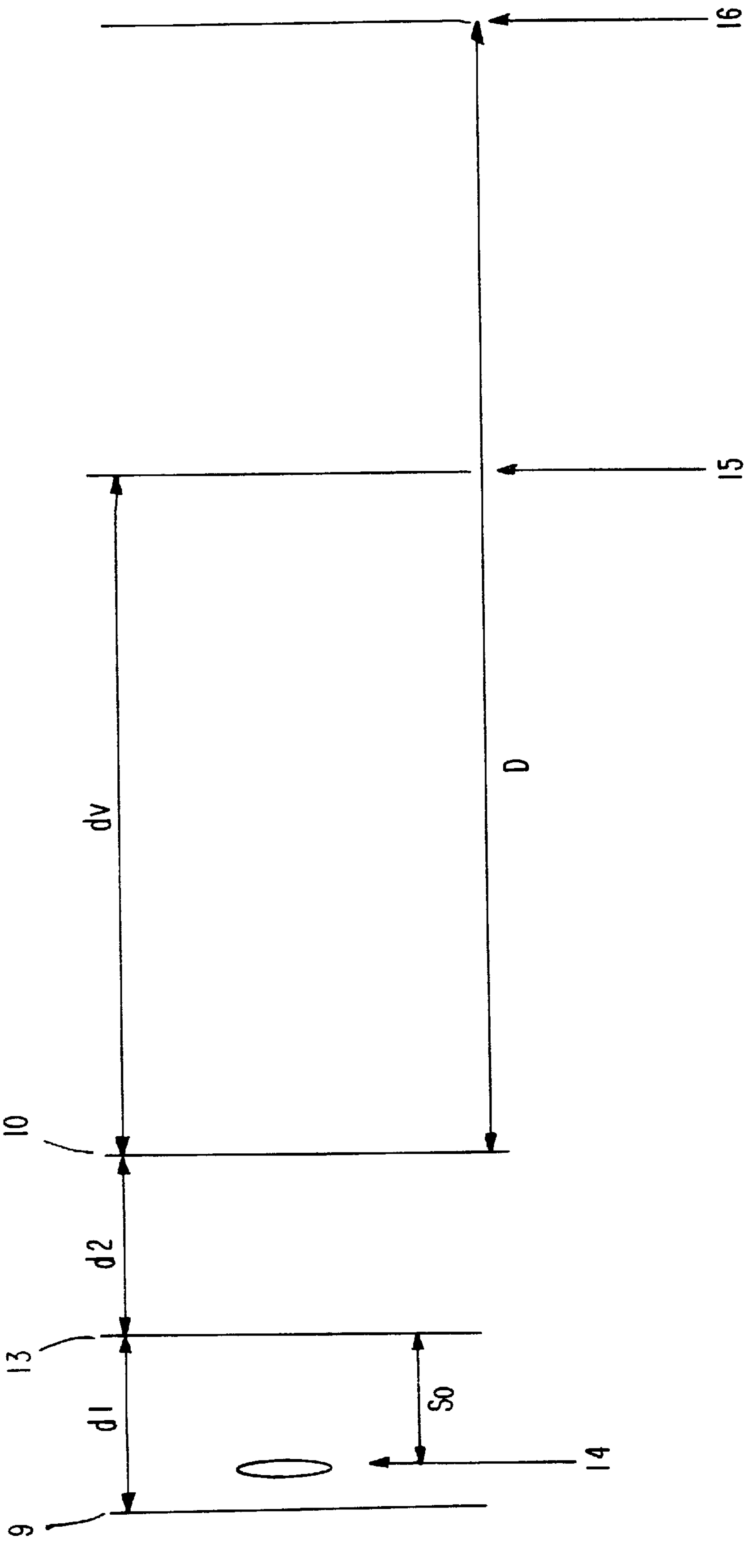
FIG. 7 is a depiction of the acceleration and analysis regions of a linear time-of-flight mass spectrometer according to conventional DE.

The optimum conditions for first order DE focusing were first given in an article by W. C. Wiley and I. H. McLaren (*Rev. Sci. Inst.* 26(12), 1150(1955)). As depicted in FIG. 7, the Wiley-McLaren apparatus includes three accelerating electrodes 9, 10, and 13. These electrodes are planar and electrically conducting. The electrodes are set apart from one another by distances d1 and d2. Ions are generated and may be allowed to drift for some time such that the average position of the ions is centered on plane 14. At the appropriate time, electrodes 9 and 13 are energized to electrical potential which will accelerate the ions towards detection plane 16. Electrode 10 is typically held at ground whereas electrodes 9 and 13 are typically energized to high electrical potentials (e.g. 3 kV) of the same polarity as the ions being analyzed. Also, the region between electrode 10 and detection plane 16 is field free.

As described in Wiley and McLaren's article, there will be an image plane 15 in such an apparatus at a distance, dv, from electrode 10. The distance, dv, is a function of the potentials on electrodes 9 and 13 and distances d1 and d2. Ions of a given mass-to-charge ratio near position 14 at the time of the energizing pulse will arrive at image plane 15 at nearly the same time. That is, ions starting with a range of positions and a range of initial kinetic energies but of the same m/z will arrive at the same place nearly simultaneously. If image plane 15 and detection plane 16 are identical then one will obtain the optimum mass resolution spectra obtainable with first order DE.

Figure 5:
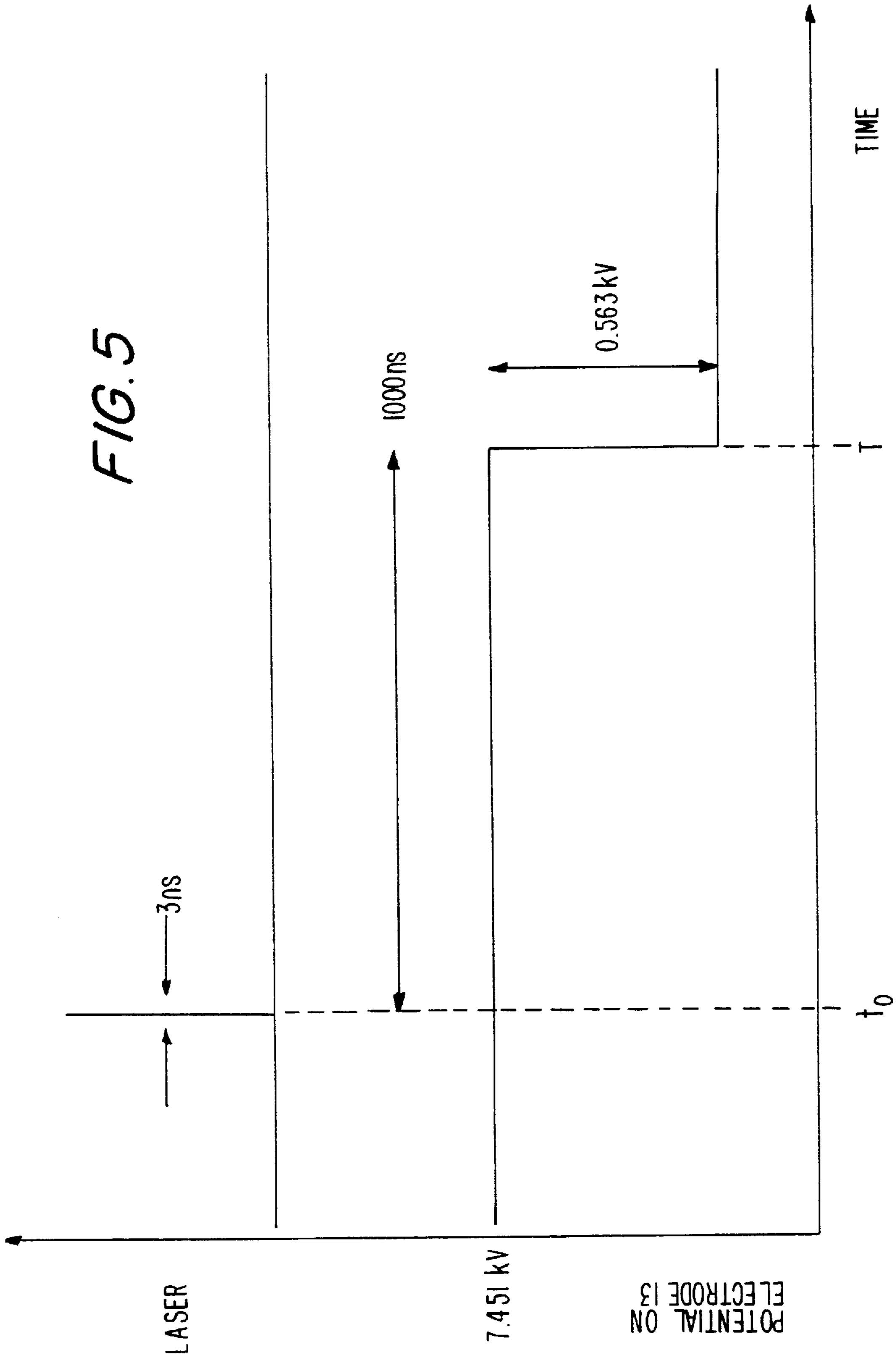
FIG. 5 is an example timing diagram showing the potential on extraction plate 13 as related in time to the ion generating laser pulse.
Figure 8A:
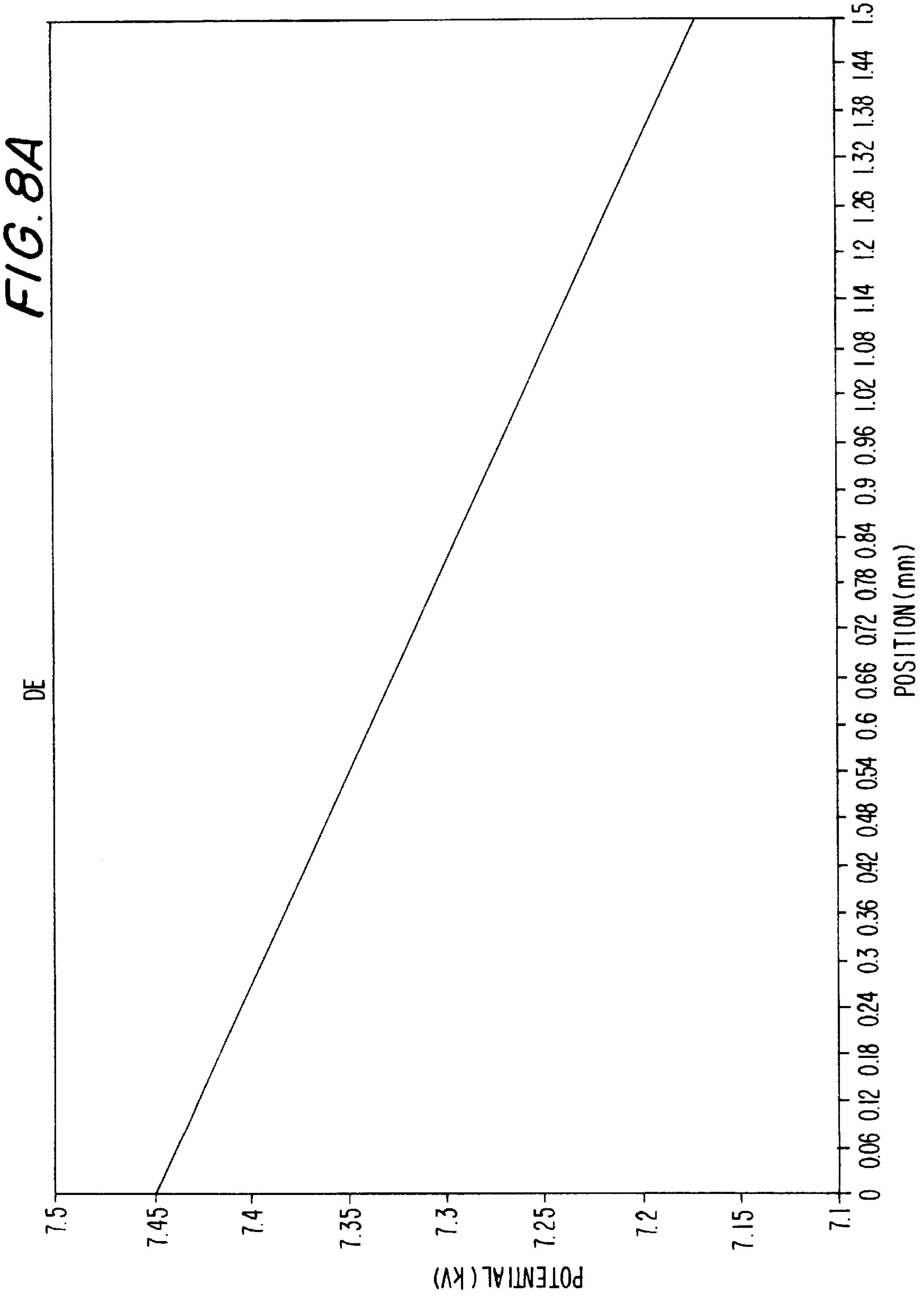
FIG. 8A is a plot of the electrical potential energy vs. position at the time of the extraction pulse in conventional first order DE.

FIG. 8A is an example plot of the optimum potential vs position, x, between electrodes 9 and 13 at and after time T. Because electrodes 9 and 13 are planar electrodes, the potential is a linear function of position. In the case depicted, d1 is 3 mm, d2 is 12 mm, D is 655 mm, T is 1 $\mu$sec, and m/z is 2,000. The potential on sample plate 9 is 7.451 kV and that on extraction electrode 13 is 6.888 kV as depicted in FIG. 5.

Figure 6:
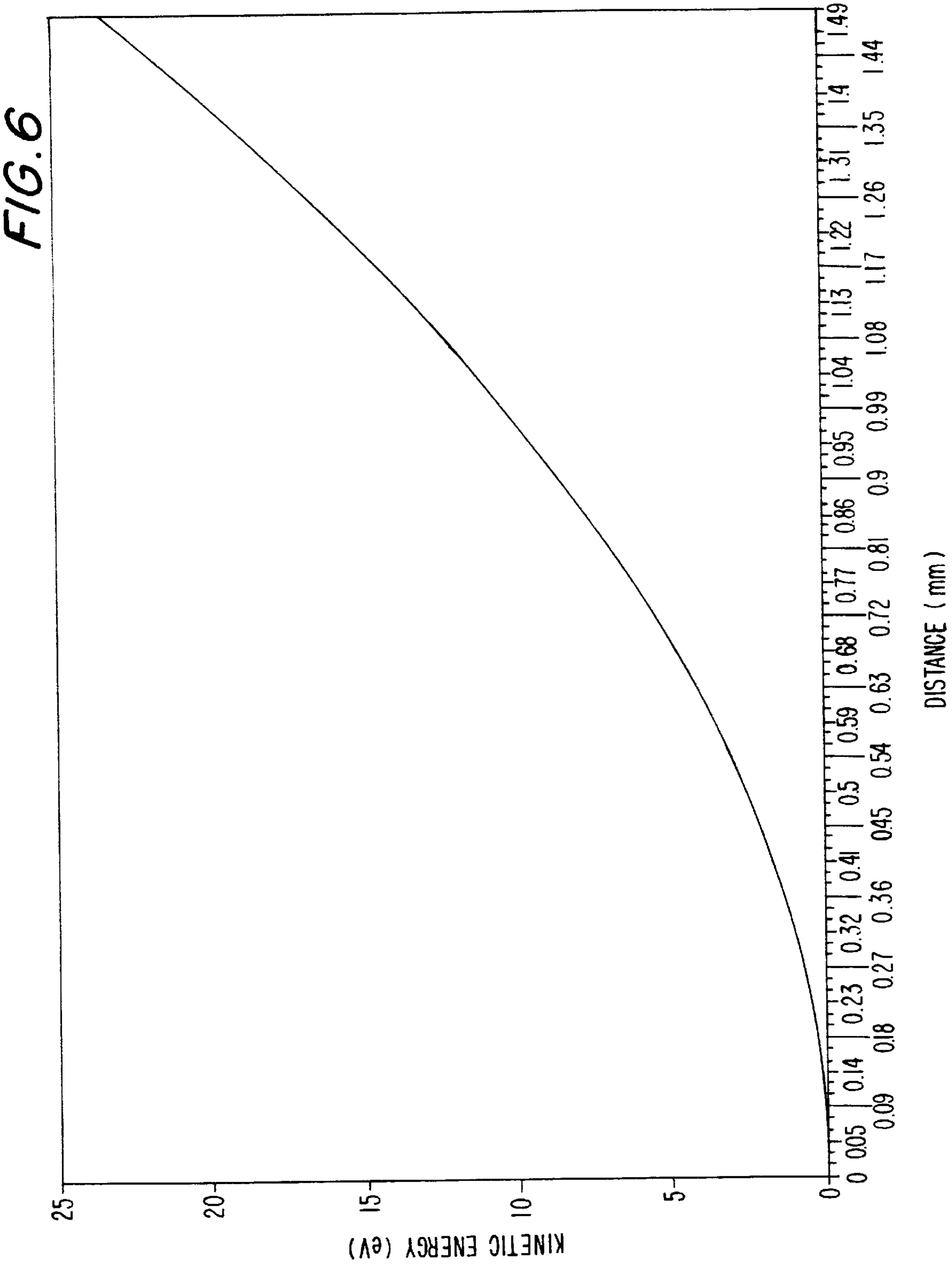
FIG. 6 is a plot of the initial kinetic energy of m/z=2,000 amu ions vs. position one $\mu$sec after the ion generating laser pulse.
Figure 8B:
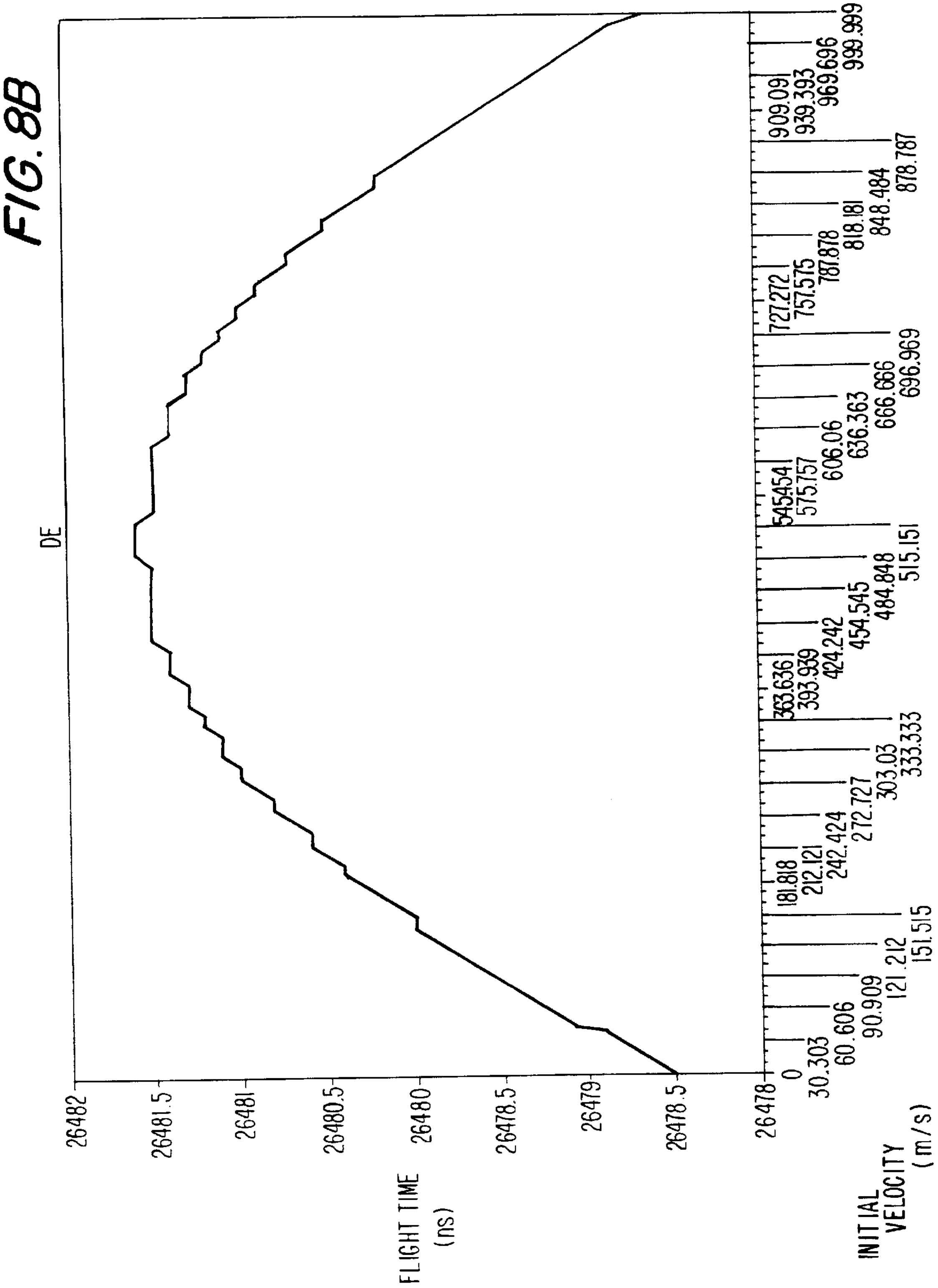
FIG. 8B is an example plot of the flight time of analyte ions vs. initial velocity in a conventional DE experiment.

Recall from FIG. 6 that the initial kinetic energy of the ions is a non-linear function of position whereas as depicted in FIG. 8A the potential energy of the ions at time T is a linear function of position. As a result, the initial kinetic energy of the ions cannot be perfectly corrected for. The plot of FIG. 8B shows the flight times of the ions as a function of their initial velocity. As shown, the ions have a distribution of flight times ranging over 3 ns. Together with error induced by other components in the instrument, this limits the mass resolution of the spectrometer to about 4,800 at m/z=2,000.

In contrast one can use a non-linear field to correct for the ion's initial kinetic energy more exactingly. An essential feature of $N^{th}$ order DE of the present invention is the use of an accelerating field consisting of N linear components. If N is large enough, a non-linear field which provides a perfect correction for the initial kinetic energy of the ions is formed. (Linear here is intended to imply $V(x)=a_o+a_1x$ whereas nonlinear implies $V(x)=a_o+a_1x+a_2x^i+\ldots+a_ix^i$ where V(x) is potential as a function of x and $a_i$ is a constant.)

Figure 9:
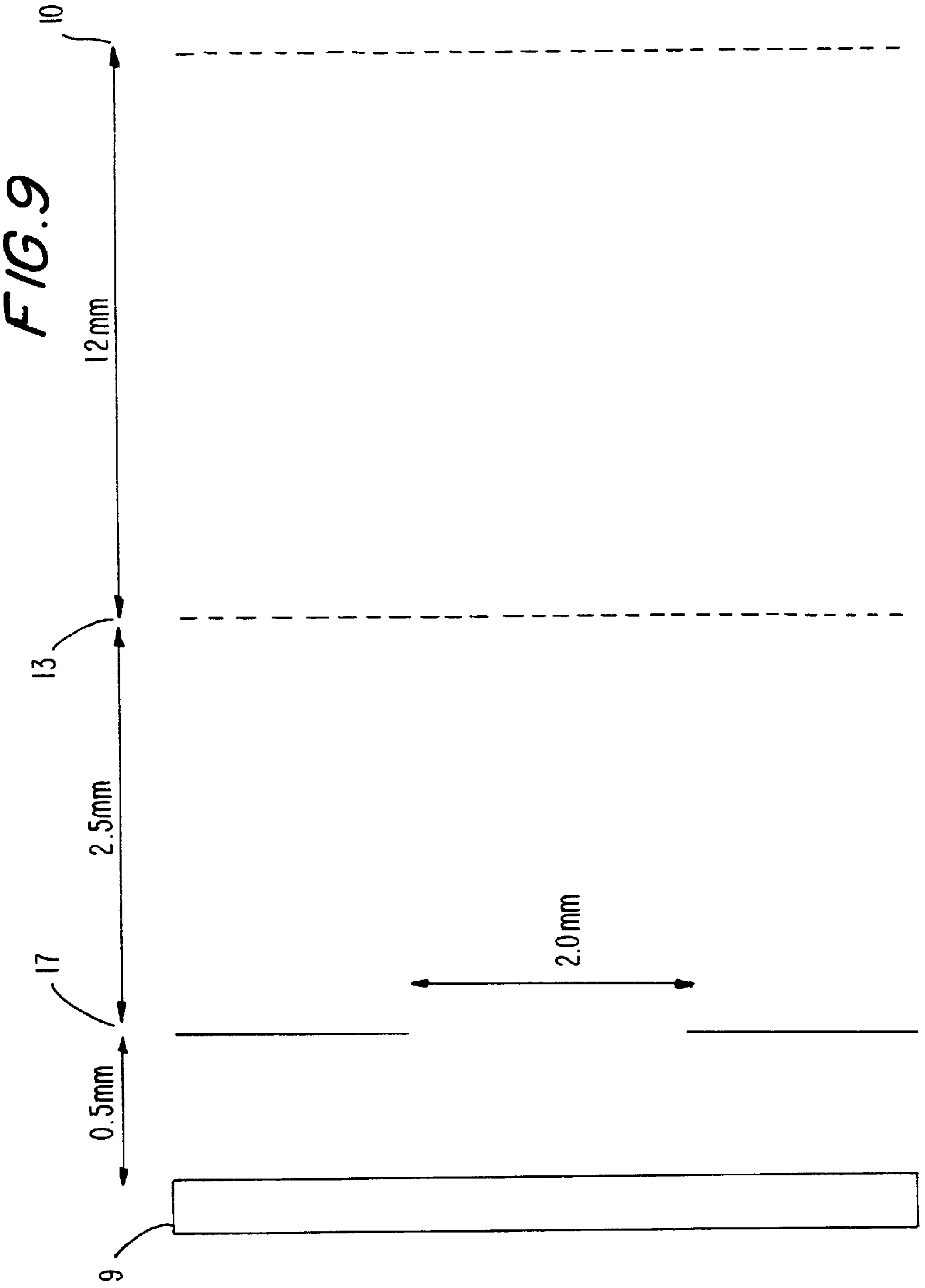
FIG. 9 is a depiction of the preferred embodiment of the second order DE apparatus.

Second order DE of the present invention uses a two component electric field between sample plate 9 and extraction electrode 13. The preferred embodiment of the second order DE apparatus is depicted in FIG. 9. This embodiment includes sample plate 9 and extraction electrodes 13 and 10. In this case extraction electrodes 13 and 10 are depicted as conducting, fine mesh grids. The grids may for example be nickel, 90% transmission, 70 lines per inch grid. Grids of other compositions and dimensions might be used. Also, apertured plates might be used for electrodes 10 and 13 instead of grids. An additional extraction electrode 17 is placed between electrodes 9 and 13. This electrode is depicted as a thin (100 um) metal foil with a 2 mm aperture. Alternatively, one might use conducting grid as mentioned above.

When operating the embodiment depicted, both electrodes 13 and 17 are pulsed in a manner similar to that depicted in FIG. 5. More specifically, in the case of m/z=2,000 amu and T=1 usec, electrodes 9, 13, and 17 would begin at a potential of 2.5 kV. At time T, electrode 13 would be pulsed down to 2.2965 kV while simultaneously electrode 17 would be pulsed down to 2.4675 kV.

Figure 10A:
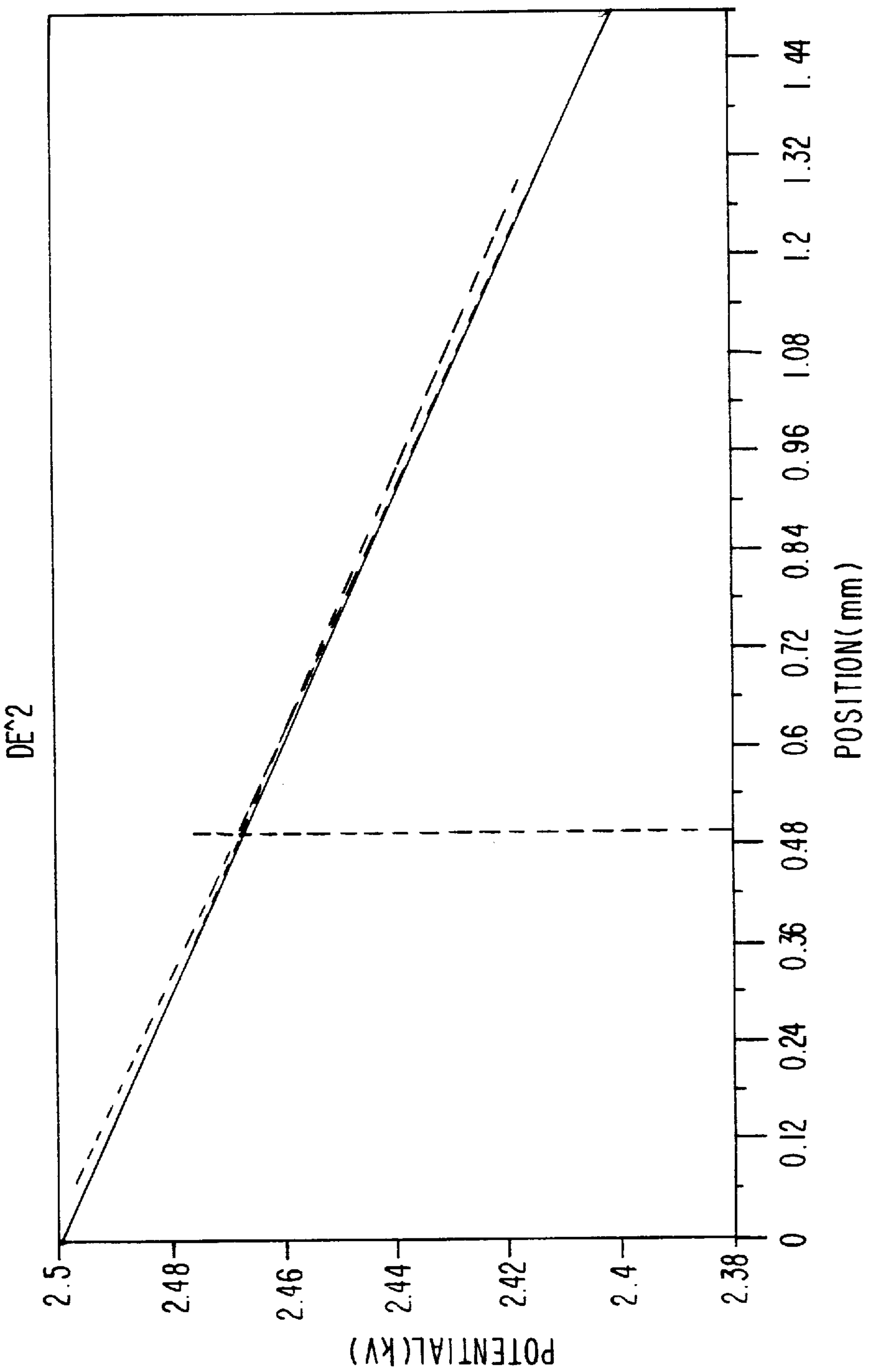
FIG. 10A is a plot of the electrical potential energy vs. distance at the time of the extraction pulse in second order DE according to the present invention.

This results in the electric field represented in the plot of FIG. 10A. As shown the electric field is composed of two linear components. Because electrode 17 is 0.5 mm from sample plate 9, the two fields meet at x=0.5 mm. The dashed lines in the plot of FIG. 10A are extensions of the lines representing the potentials of the two fields. Notice that the optimum conditions for second order DE focusing occurs at much lower electrode potentials.

Figure 10B:
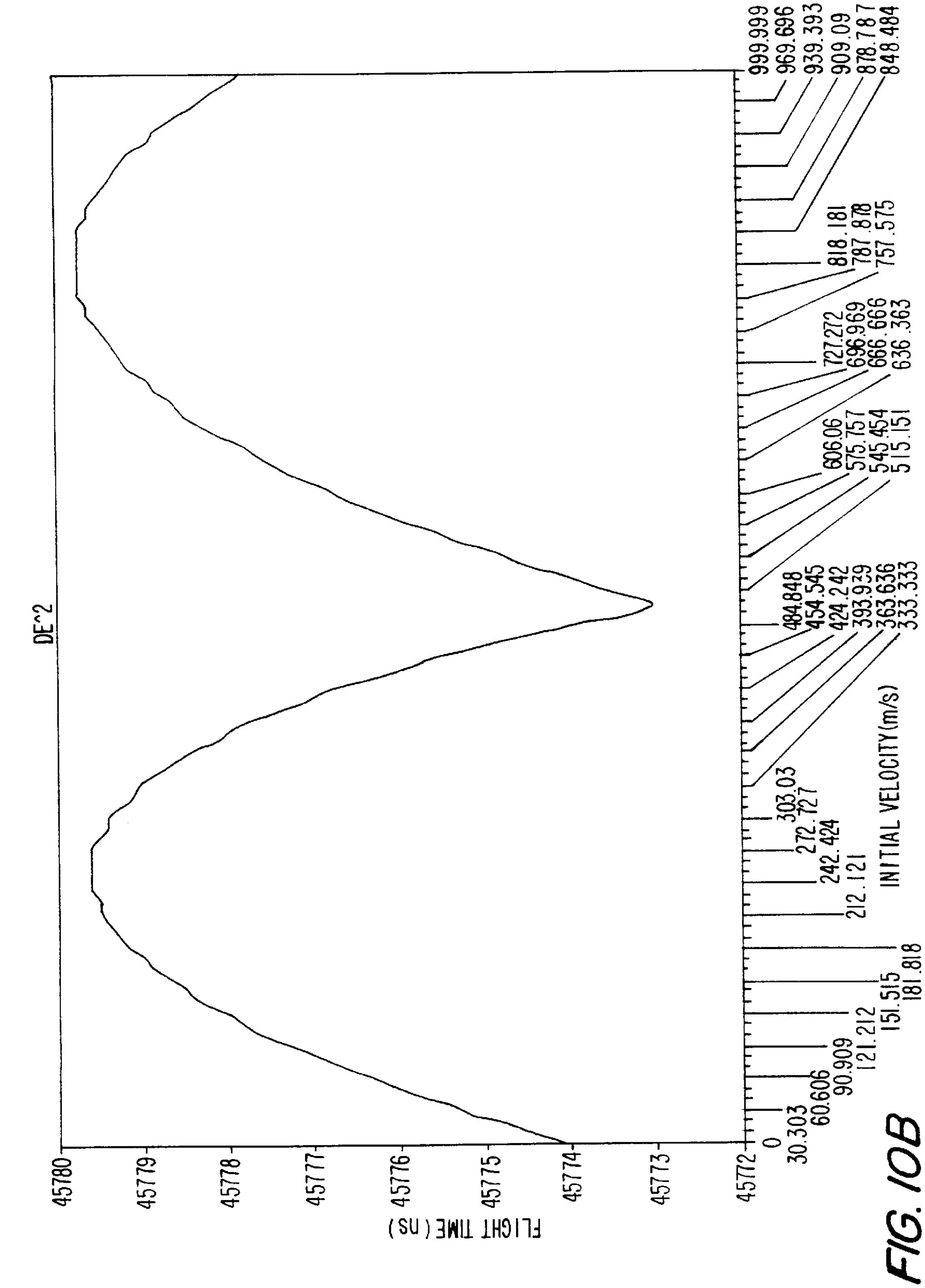
FIG. 10B is a example plot of the flight time of analyte ions vs. initial velocity in a second order DE experiment according to the present invention.

Because a two component accelerating field is used, a better correction can be made for the initial kinetic energy of the ions. FIG. 10B shows a plot of the ion flight time as a function of initial velocity under the second order DE conditions given in FIG. 10A. The range of ion flight times in this case covers about 6 ns, however, because a lower accelerating voltage is used, the flight time of the ions is much longer than in the case of conventional DE. As a result, the resolution limit of the spectrometer is about 6,100 at m/z=2,000 as opposed to the 4,800 obtained with conventional DE.

In theory, Nth order DE may be used to correct for the initial kinetic energy of the ions as exactingly as desired. One need only produce an accelerating field whose potential is the correct function of position. As the number of linear components to the accelerating field, N, becomes large, the ideal field can be closely approximated and the ions can be focused nearly perfectly in time.

Figure 11:
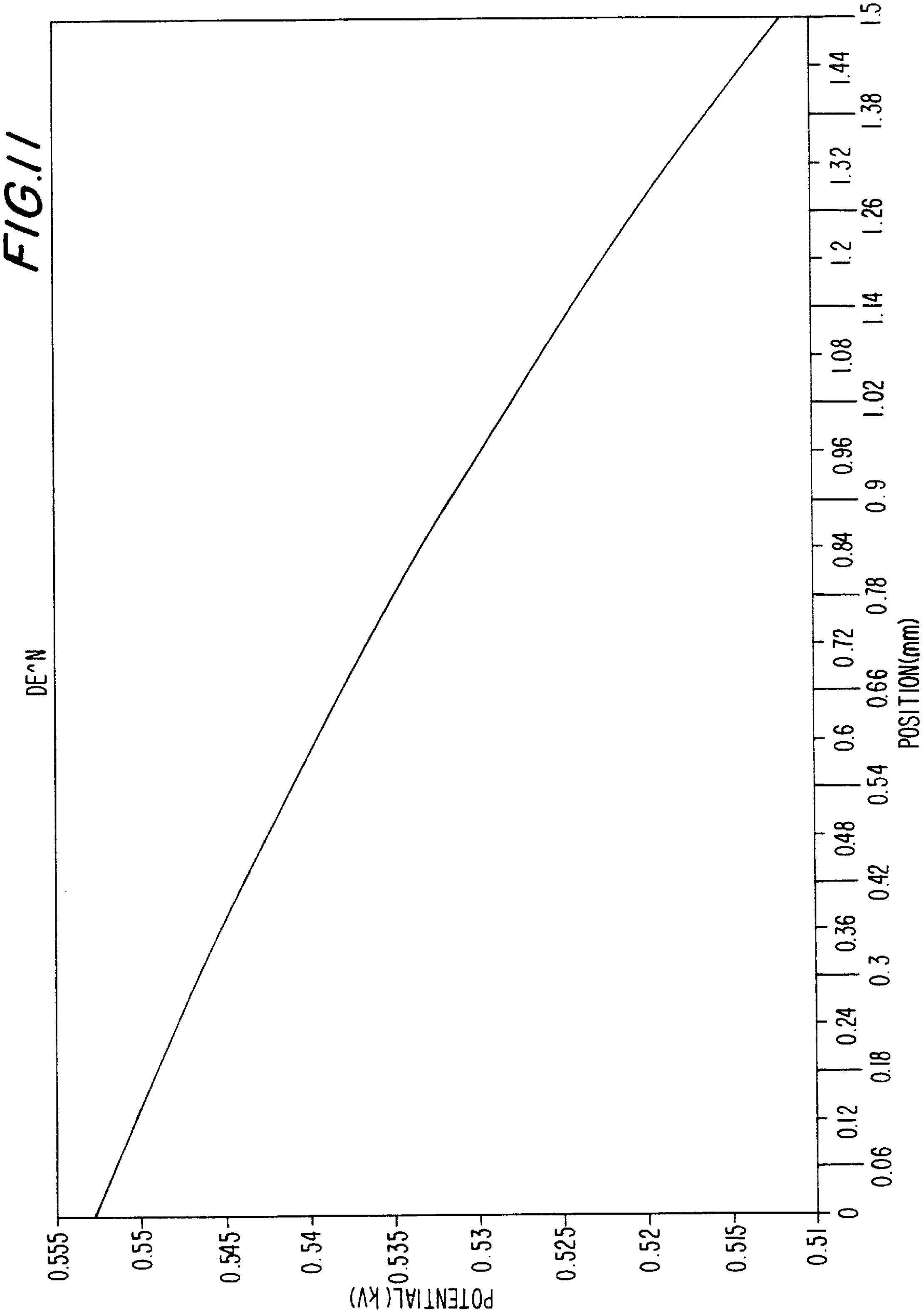
FIG. 11 is a plot of the electrical potential energy vs. distance at the time of the extraction pulse in $N^{th}$ order DE according to the present invention.

An example of an ideal field is represented in the plot of FIG. 11. In FIG. 11 the potential in the region between electrodes 9 and 13 is plotted as a function of position. In the calculation of this field it was assumed that T=1 us, m/Z=2000 amu, d1=3 mm, d2=12 mm, and D=655 mm. In such a case, the flight time of the ions from the source to the detection plane is 95.07 usec. The distribution of flight times of the ions is less than 0.1 ns. Thus, the resolution in this example is limited by other components of the instrument to 42,000 at m/z=2,000.

Figure 12:
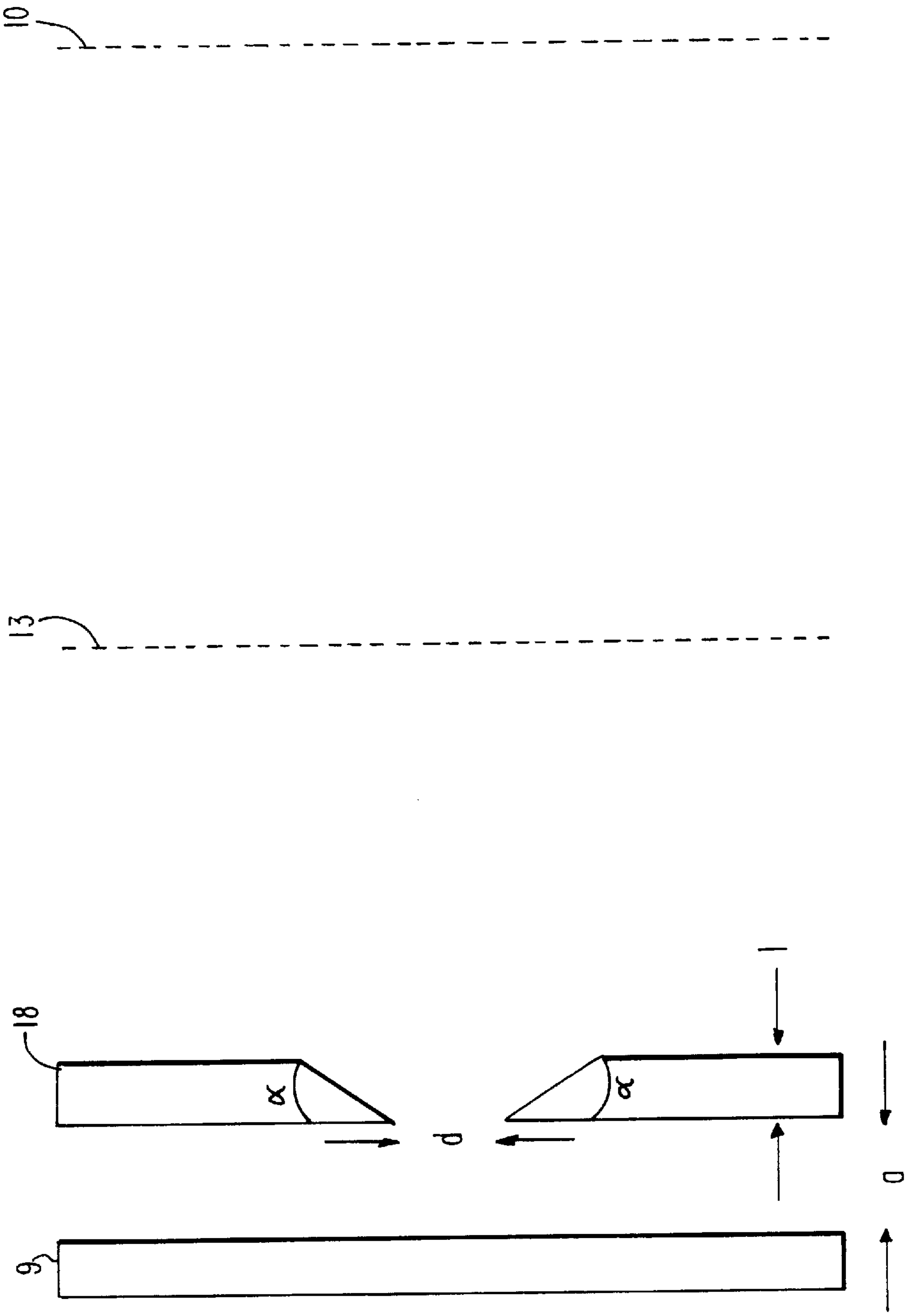
FIG. 12 is a depiction of the preferred embodiment of the Nth order DE apparatus.

The presently preferred embodiment of the apparatus for producing such a field is depicted in FIG. 12. As shown, a conducting, apertured, electrode 18 is placed between electrodes 9 and 13. The position, a, thickness, l, the diameter of the aperture, d, and the angle, $\alpha$, of the taper on the aperture hole are chosen so as to produce the proper potential gradient. In the particular case discussed in FIG. 11, a=0.1 mm, l=0.5 mm, $\alpha$=23.5°, and d=1 mm. Also, the potential of electrode 18 is always the same as that of electrode 9—in this case 552.97 V. Electrode 13 is pulsed to 454.96 V at time T and electrode 10 is held at ground.

Figure 13:
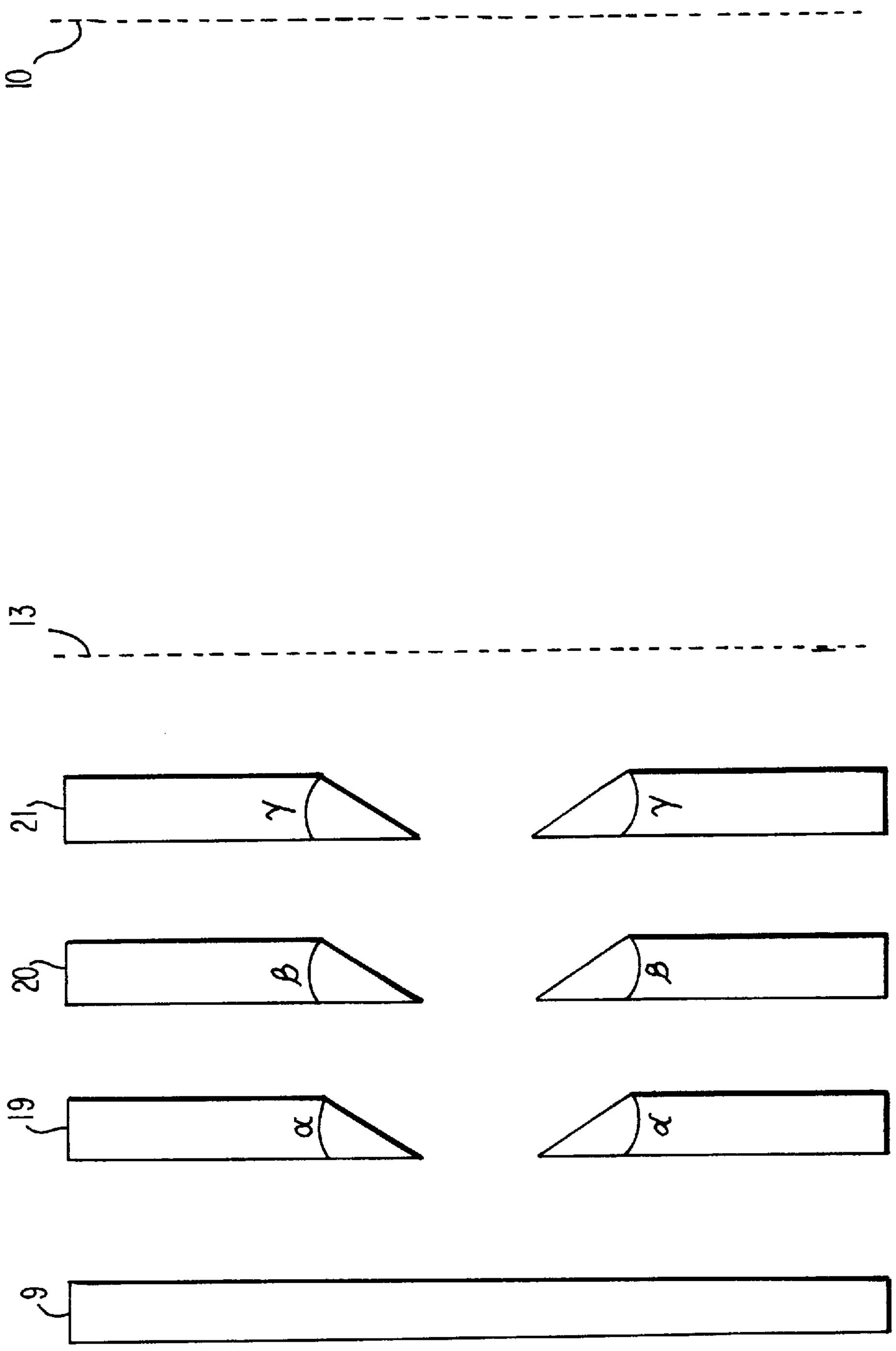
FIG. 13 is a depiction of an alternate embodiment of the Nth order DE apparatus of the present invention.

Finally, an alternate embodiment of the apparatus for producing the ideal field is depicted in FIG. 13. This apparatus includes electrodes 19, 20, and 21 which are all similar in nature to electrode 18. That is, electrodes 19, 20, and 21 are all electrically conducting, apertured electrodes and all have independently adjustable thicknesses, aperture diameters, positions, and potentials. The shape and potentials of electrodes 19—21 are chosen to produce the desired field. Any number of electrodes similar in design to electrode 18 can be placed between electrodes 9 and 13 so as to produce the desired field.

Although the invention herein has been described with reference to particular embodiments, it is to be understood that these embodiments are merely illustrative of the principles and applications of the present invention. It is therefore to be understood that numerous modifications may be made to the embodiments described herin and that other arrangements and techniques may be devised without departing from the intended scope of the present invention as defined by the appended claims.

What is claimed is:

1. A time of flight mass spectrometer capable of providing improved mass resolution, said spectrometer comprising:

a sample plate;

extraction electrodes; and more than one apertured electrodes;

wherein said apertured electrodes are positioned between said sample plate and said extraction electrodes such that a non-linear electric field of an order equal to the number of said apertured electrodes is produced which decreases the flight time distribution of said ions.

2. An improved time of flight mass spectrometer according to claim 1 wherein said extraction electrodes are conducting, fine mesh grids.

3. An improved time of flight mass spectrometer according to claim 2 wherein said grids are nickel, 90% transmission, 70 lines per inch grids.

4. An improved time of flight mass spectrometer according to claim 1 wherein said extraction electrodes are apertured plates.

5. An improved time of flight mass spectrometer according to claim 4 wherein said apertured plates are constructed from thin, metal foil.

6. An improved time of flight mass spectrometer according to claim 5 wherein said grids are nickel, 90% transmission, 70 lines per inch grids.

7. An improved time of flight mass spectrometer according to claim 1 wherein said apertured electrodes are conducting, fine mesh grids.

8. An improved time of flight mass spectrometer according to claim 1 wherein said extraction electrodes are apertured plates.

9. An improved time of flight spectrometer according to claim 1 wherein said apertured electrodes have independently adjustable thicknesses, aperture diameters, positions, and potentials such that a desired field may be produced.

10. A delayed extraction apparatus for use in a time of flight mass spectrometer, said apparatus comprising:

an electrode plate on which a sample to be ionized may be positioned;

extraction electrodes, placed a pre-determined distance from said electrode plate, which may be powered to create an electric field capable of extracting ions from said ionized sample; and more than one apertured electrodes positioned between said electrode plate and said extraction electrodes, the shape, potentials and number of said apertured electrodes being selected such that a non-linear electric field of an order equal to the number of said apertured electrodes is produced, said field being capable of decreasing the flight time distribution of said ions, thereby increasing mass resolution.

11. An improved apparatus according to claim 10 wherein said extraction electrodes are conducting, fine mesh grids.

12. An improved apparatus according to claim 11 wherein said grids are nickel, 90% transmission, 70 lines per inch grids.

13. An improved apparatus according to claim 10 wherein said extraction electrodes are apertured plates.

14. An improved apparatus according to claim 13 wherein said apertured plates are constructed from thin, metal foil.

15. An improved apparatus according to claim 10 wherein said apertured electrodes are conducting, fine mesh grids.

16. An improved apparatus according to claim 15 wherein said grids are nickel, 90% transmission, 70 lines per inch grids.

17. An improved apparatus according to claim 10 wherein said extraction electrodes are apertured plates.

18. An improved apparatus according to claim 10 wherein said apertured electrodes have independently adjustable thicknesses, aperture diameters, positions, and potentials such that a desired field may be produced.

19. A method of decreasing the flight time distribution, and thereby increasing the mass resolution, of ions being resolved in a time of flight mass spectrometer, said method comprising the steps of:

placing a sample to be tested on an electrode plate;

placing more than one extraction electrodes at a pre-determined distance from said electrode plate placing one or more apertured electrodes between said electrode plate and said extraction electrodes; and powering said electrodes such that a nonlinear electric field of an order equal to the number of said apertured electrodes is created; and ionizing said sample such that ions of said sample are extracted through said electrodes at pre-determined time intervals.

20. A method according to claim 19 wherein said apertured electrodes have independently adjustable thicknesses, aperture diameters, positions, and potentials such that a desired field may be produced.

* * * * *